United States Patent [19]

Benson, Jr. et al.

[11] Patent Number: 5,691,846

[45] Date of Patent: Nov. 25, 1997

[54] ULTRA-FLEXIBLE RETROREFLECTIVE CUBE CORNER COMPOSITE SHEETINGS AND METHODS OF MANUFACTURE

[75] Inventors: Olester Benson, Jr., Woodbury; Cheryl M. Frey, White Bear Lake; Jeanine M. Shusta, Mahtomedi; Susan K. Nestegard, Woodbury, all of Minn.; Vera L. Lightle, Hudson, Wis.; Kenneth L. Smith, White Bear Lake; Chester A. Bacon, Jr., Oakdale, both of Minn.

[73] Assignee: Minnesota Mining and Manufacturing Company, St. Paul, Minn.

[21] Appl. No.: 472,444

[22] Filed: Jun. 7, 1995

Related U.S. Application Data

[63] Continuation-in-part of Ser. No. 326,696, Oct. 20, 1994, abandoned, which is a continuation-in-part of Ser. No. 285,648, Aug. 3, 1994, abandoned, which is a continuation-in-part of Ser. No. 139,433, Oct. 20, 1993, Pat. No. 5,450,235, and a continuation-in-part of Ser. No. 139,914, Oct. 20, 1993, Pat. No. 5,614,286.

[51] Int. Cl.$^6$ ..................................... G02B 5/124
[52] U.S. Cl. ..................... 359/530; 359/529; 359/900; 156/245; 264/214; 428/172
[58] Field of Search .................. 359/529–550, 359/515–524, 900; 264/1.1, 1.9, 166, 212–214, 216; 156/230–232, 242–243, 245; 428/167, 172, 161

[56] References Cited

U.S. PATENT DOCUMENTS

| | | |
|---|---|---|
| 3,190,178 | 6/1965 | McKenzie . |
| 3,450,459 | 6/1969 | Haggerty . |
| 3,632,695 | 1/1972 | Howell ........................... 264/1 |
| 3,684,348 | 8/1972 | Rowland . |

(List continued on next page.)

FOREIGN PATENT DOCUMENTS

| | | |
|---|---|---|
| 0 175 031 A1 | 3/1986 | European Pat. Off. . |
| A 0 200 521 | 11/1986 | European Pat. Off. . |

(List continued on next page.)

OTHER PUBLICATIONS

Yoder, P.R. Jr., "Study of Light Deviation Errors in Triple Mirrors and Tetrahedral Prisms," *J. Optical Soc. of America*, vol. 48, No. 7, Jul. 1959, pp. 496–499.

Leighton, J. et al., "RF Welding and PVC and Other Thermoplastic Compounds," *ANTEC*, 1992, pp. 724–728.

Priola, A., et al., *Proceedings of the XIII International Conference in Organic Coatings Science and Technology*, Athens, Greece, Jul. 7–11, 1987, pp. 308–318.

*Primary Examiner*—James Phan
*Attorney, Agent, or Firm*—Gary L. Griswold; Walter N. Kirn; Robert H. Jordan

[57] ABSTRACT

A method for manufacturing flexible cube corner retroreflective sheeting comprising the steps of:

a) providing a tool having a molding surface;

b) applying to the molding surface a volume of a flowable resin composition;

c) contacting the resin composition with a first major surface of an overlay film;

d) minimizing excess resin composition;

e) curing the resin composition to form a sheeting comprising an array of cube corner elements bonded to the overlay film;

f) removing the sheeting from the tool; and g) applying mechanical stress to the sheeting so as to cause a fractured separation of substantially each individual cube corner element from surrounding cube corner elements. Also, flexible retroreflective sheetings comprising: a) a two dimensional array of substantially independent cube corner elements, the array comprising a first polymeric material, and b) an overlay film having two major surfaces and comprising of a second polymeric material, the array being bonded to the first major surface of the overlay film. Also safety devices incorporating such sheetings.

48 Claims, 5 Drawing Sheets

U.S. PATENT DOCUMENTS

| | | | |
|---|---|---|---|
| 3,689,346 | 9/1972 | Rowland | 156/245 |
| 3,700,305 | 10/1972 | Bingham . | |
| 3,712,706 | 1/1973 | Stamm . | |
| 3,810,804 | 5/1974 | Rowland | 156/245 |
| 3,811,983 | 5/1974 | Rowland | 156/245 |
| 3,830,682 | 8/1974 | Rowland | 161/2 |
| 3,924,929 | 12/1975 | Holmen et al. . | |
| 3,926,402 | 12/1975 | Heenan et al. | 249/117 |
| 3,935,359 | 1/1976 | Rowland | 428/172 |
| 3,992,080 | 11/1976 | Rowland . | |
| 4,025,159 | 5/1977 | McGrath . | |
| 4,202,600 | 5/1980 | Burke et al. . | |
| 4,243,618 | 1/1981 | Van Arnam | 264/1 |
| 4,332,847 | 6/1982 | Rowland | 428/156 |
| 4,349,598 | 9/1982 | White | 428/161 |
| 4,414,316 | 11/1983 | Conley | 430/496 |
| 4,486,363 | 12/1984 | Pricone et al. | 264/1.4 |
| 4,555,161 | 11/1985 | Rowland . | |
| 4,576,850 | 3/1986 | Martens | 428/156 |
| 4,588,258 | 5/1986 | Hoopman . | |
| 4,601,861 | 7/1986 | Pricone et al. | 264/1.6 |
| 4,668,558 | 5/1987 | Barber | 428/156 |
| 4,775,219 | 10/1988 | Appeldorn et al. . | |
| 4,801,193 | 1/1989 | Martin . | |
| 4,895,428 | 1/1990 | Nelson et al. . | |
| 4,938,563 | 7/1990 | Nelson et al. . | |
| 5,066,098 | 11/1991 | Kult et al. | 359/540 |
| 5,077,117 | 12/1991 | Harper et al. | 428/143 |
| 5,117,304 | 5/1992 | Huang et al. | 359/529 |
| 5,138,488 | 8/1992 | Szczech | 359/529 |
| 5,175,030 | 12/1992 | Lu et al. | 428/30 |
| 5,183,597 | 2/1993 | Lu | 264/1.4 |
| 5,189,553 | 2/1993 | Smith | 359/530 |
| 5,213,872 | 5/1993 | Pricone et al. | 428/195 |
| 5,229,882 | 7/1993 | Rowland | 359/530 |
| 5,236,751 | 8/1993 | Martin et al. | 428/40 |
| 5,264,063 | 11/1993 | Martin | 156/247 |
| 5,272,562 | 12/1993 | Coderre | 359/529 |
| 5,376,431 | 12/1994 | Rowland | 428/164 |
| 5,491,586 | 2/1996 | Phillips | 359/530 |

FOREIGN PATENT DOCUMENTS

| | | |
|---|---|---|
| 0 382 420 A2 | 8/1990 | European Pat. Off. . |
| 0 478 178 A1 | 4/1992 | European Pat. Off. . |
| 23 17 871.4 | 10/1974 | Germany . |
| 2 245 219 | 1/1992 | United Kingdom . |
| WO 92/04647 | 3/1992 | WIPO . |
| WO 94/19711 | 9/1994 | WIPO . |
| WO 95/03558 | 2/1995 | WIPO . |
| WO 95/07179 | 3/1995 | WIPO . |
| WP 95/11466 | 4/1995 | WIPO . | und ULTRA-FLEXIBLE RETROREFLECTIVE CUBE CORNER COMPOSITE SHEETINGS AND METHODS OF MANUFACTURE

CROSS-REFERENCE TO RELATED APPLICATION

This application is a continuation-in-part of U.S. application Ser. No. 08/326,696, filed Oct. 20, 1994, abandoned which is a continuation-in-part of both U.S. application Ser. No. 08/285,648, filed Aug. 3, 1994, abandoned which was a continuation-in-part of U.S. application Ser. No. 08/139, 433, filed Oct. 20, 1993, now U.S. Pat. No. 5,450,235, and U.S. application Ser. No. 08/139,914, filed Oct. 20, 1993, now U.S. Pat. No. 5,614,286.

FIELD OF INVENTION

This invention relates in general to flexible composite sheetings comprising prismatic or cube corner retroreflective elements, methods for manufacturing such materials, and articles comprising such materials.

BACKGROUND

Retroreflective materials have the property of redirecting incident light back towards its originating source. This advantageous property has led to the wide-spread use of retroreflective sheetings on a variety of articles. Very often the retroreflective sheetings are used on flat inflexible articles, for example, road signs and barricades; however, situations frequently arise which require the sheetings to be used on irregular or flexible surfaces. For example, a retroreflective sheeting may be adhered to the side of a truck trailer, which requires the sheeting to pass over corrugations and protruding rivets, or the sheeting may be adhered to a flexible substrate such as a road worker's safety vest or other such safety garment. In situations where the underlying surface is irregular or flexible, the retroreflective sheeting desirably possesses good conformability and flexibility but not at the expense of sacrificing retroreflective performance.

There are two common types of retroreflective sheeting: microsphere-based sheeting and cube corner sheeting. Microsphere-based sheeting, sometimes referred to as "beaded" sheeting, is well known in the art and employs a multitude of microspheres, typically at least partially embedded in a binder layer and having associated specular or diffuse reflecting materials (e.g., pigment particles, metal flakes or vapor coats, etc.) to retroreflect incident light. The microspheres are separate from each other and therefore do not severely hinder the sheeting's ability to be flexed. Illustrative examples of such retroreflectors are disclosed in U.S. Pat. Nos. 3,190,178 (McKenzie), 4,025,159 (McGrath), and 5,066,098 (Kult). Cube corner sheeting, on the other hand, typically employs a multitude of rigid interconnected cube corner elements to retroreflect incident light. During flexing, the shape of the cube corner elements can become distorted, resulting in a substantial degradation of retroreflective performance. As a result, the construction of a cube corner sheeting limits the degree to which the sheeting can be conformed or flexed while still maintaining desired minimum standards of retroreflectivity.

Cube corner retroreflectors typically comprise a sheet having a generally planar front surface and an array of cube corner elements protruding from the back surface. Cube corner reflecting elements comprise generally trihedral structures which have three approximately mutually perpendicular lateral faces meeting in a single corner, i.e., cube corner. In use, the retroreflector is arranged with the front surface disposed generally toward the anticipated location of intended observers. Light incident to the front surface enters the sheet, passes through the body of the sheet to be internally reflected by the faces of the elements so as to exit the front surface in a direction substantially toward the light source, i.e., retroreflection. The light rays are typically reflected at the cube faces due to either total internal reflection ("T.I.R."), or reflective coatings such as a vapor-deposited aluminum film. However, use of metallized aluminum coating on the prism surface tends to produce a grey coloration to the observer in ambient light or daylight conditions, and is thus considered aesthetically undesirable for some applications. Illustrative examples of cube corner type reflectors are disclosed in U.S. Pat. Nos. 3,712,706 (Stamm), 4,025,159 (McGrath), 4,202,600 (Burke et al.), 4,243,618 (Van Arnam), 4,349,598 (White), 4,576,850 (Martens), 4,588,258 (Hoopman), 4,775,219 (Appeldorn et al.), and 4,895,428 (Nelson et al.). In embodiments which are to be used in environments where the conformable cube corner retroreflective sheeting is likely to be exposed to moisture, e.g., outdoors or in high humidity, it may be preferred that cube corner retroreflective elements be encapsulated with a conformable sealing film. The aforementioned U.S. Pat. No. 4,025,159 discloses encapsulation of cube corner retroreflective elements using a sealing film.

Cube corner retroreflectors typically have a higher retroreflective efficiency than microsphere-based retroreflectors and are sometimes preferred for this reason. However, many desired applications such as retroreflective posts, cones, barrels, safety helmets, vests, corrugations or rivets on truck trailer surfaces, etc. require that the sheeting bend and conform to curved substrates. The cubes of cube corner retroreflectors are ideally made of resins having high glass transition temperatures ($T_g$) so that the cubes maintain their dimensions and shape without distortion, and thus remain capable of providing bright retroreflection upon being exposed to high temperatures or high levels of humidity over time. Such resins are typically rigid (i.e., have a high flexural modulus). Unlike microsphere-based sheetings where the microspheres are generally much higher in modulus than the binder resin in which the microspheres are embedded, the cube corner retroreflective elements of cube corner retroreflectors tend to undergo significant optically degrading deformation as the retroreflector is forced to conform to a non-planar substrate because the cubes are typically relatively similar in modulus, if not identical, to the rest of the sheeting.

The manufacture of retroreflective cube corner element arrays is typically accomplished using molds made by different techniques, including those known as pin bundling and direct machining. Molds manufactured using pin bundling are made by assembling together individual pins which each have an end portion shaped with features of a cube corner retroreflective element. U.S. Pat. No. 3,632,695 (Howell) and U.S. Pat. No. 3,926,402 (Heenan et al.) disclose illustrative examples of pin bundling. The direct machining technique, also known generally as ruling, comprises cutting away portions of a substrate to create a pattern of grooves which intersect to form structures including cube corner elements. The grooved substrate is typically used as a master from which a series of impressions, i.e., replicas, may be formed. In some instances, the master itself is useful as a retro-reflective article. However replicas, including multi-generational replicas, are more commonly used as the retro-reflective article. Direct machining is an excellent method for manufacturing master molds for small microcube arrays. Small microcube arrays are particularly beneficial for producing thin replica arrays with improved flexibility. Microcube arrays are also more conducive to continuous process manufacturing. The process of manufacturing large arrays is also relatively easier using direct machining methods rather than other techniques. An illustrative example of direct machining is disclosed in U.S. Pat. No. 4,588,258 (Hoopman).

FIGS. 1 and 2 schematically illustrate a portion of a typical replicated cube corner retroreflective sheet 10. The geometry or configuration of this type of article is described, for example, in U.S. Pat. No. 3,810,804 (Rowland). Referring to both FIGS. 1 and 2, reference 12 generally designates one of the minute cube corner elements of formations disposed in an array on one side of sheeting 10. Each element 12 has the shape of a trihedral prism with three exposed planar faces, substantially perpendicular to one another, with the apex of the prism vertically aligned with the center of the base. The angle between the faces is the same for each cube corner element in the array, and will be about 90°. Such angle can slightly deviate from 90° by design, i.e., the angle will be dependent upon the particular application of the sheeting. State governments in the United States of America, for applications involving traffic safety signs, markers and the like, generally specify that maximum retroreflective brightness be at from 0.2° to 2° divergence (or observational) angles, thus dictating a specific angle between the faces of the cube corner elements in the marker. As is illustrated in FIG. 1, cube corner elements 12 in sheet 10 can be all of the same dimensions and aligned in an array or pattern of rows and columns, the bases being in the same plane, and adjacent elements being contiguous at the edges of their bases such that there are no margins or flats between adjacent elements or spaced apart (not shown) as desired. If desired, different elements in the array may have varying dimensions and orientations. In some embodiments (not shown) the protruding elements each possess more than one cube corner apex. Cube corner elements 12 surmount body portion 13, lower or front surface 16 of which is smooth or planar. Body portion 13 is preferably integral with cube corner optical elements 12, constituting what is referred to as a land. The dimensions of the land portion of the sheeting relative to the individual cube corner optical elements will vary depending on the method chosen for manufacture and, ultimately, the end purpose of the sheeting.

U.S. Pat. No. 3,689,346 (Rowland) discloses a process for continuous replication of cube corner retroreflective articles by depositing a crosslinkable, partially polymerized resin, such as certain acrylic acid ester resins, on a negative molding surface to be replicated, and exposing the resin to actinic light or heat to solidify the resin. The resins disclosed in this patent have typically exhibited relatively high levels of shrinkage upon solidifying or curing, thus giving rise to optical imperfections in the cube corner microstructure, i.e., changes in the angles between the faces of the cube corner that produce light scattering rather than the desired maximum retroreflectivity. This phenomenon can be better understood through a brief discussion of the basic principles of optics involved in the functioning of retroreflective cube corner sheeting.

The principle of operation of retroreflective cube corner structures is well known, and has long been recognized, e.g., see *J. Optical Soc. of America* 46(7): 496 (1958). This principle is illustrated by FIG. 3. Reference to that figure, in which a cross-section of a single cube corner optical element 12 is shown schematically with two of its faces 14, 15 being substantially perpendicular to one another as shown by the angle 90° ±θ, and body portion 13 having an exposed lower surface 16. An incident ray of light, I, enters element 12 upon striking surface 16 in a direction perpendicular thereto, passes through the body portion 13, strikes face 14, is reflected to the other faces, is reflected from the latter and passes out of the element as reflected ray I'. Perfect retroreflection of incident ray I for the particular element shown in FIG. 3 would result in a ray passing out the element in a path, shown by the broken line, exactly parallel to the path of the incident ray, I. The deviation between the path of perfect reflection and the actual path, I', is shown by the divergence angle δ, which will typically be on the order of 0.2° to 2° for most useful traffic control devices. In order to achieve and control required divergence angles, the desired dimensions and angles of the cube corner elements must be maintained within very narrow limits. For example (see *J. Optical Soc. of America* 46(7):496 (1958)), for a plastic having an index of refraction of 1.5 (typical for the plastics comprising the shaped articles described herein), the divergence angle δ can be expressed by the equation δ=4.9θ. Thus, when δ is 0.2°, θ is 0.041°, or 2.46 minutes of arc, which is an exceedingly small angle of tolerance within which to maintain the specified geometry of the cube corner elements.

If the angles between faces of a replicated cube corner element cannot be controlled and maintained, e.g., because of shrinkage effects, distortion upon removal from the mold, or distortion due to thermal or mechanical stresses, the efficiency of retroreflection will be materially affected. Even a slight lack of control and maintenance of the cube corner geometry can significantly adversely affect the resultant retroreflective efficiency. Rigid, high elastic modulus plastics, such as polymethylmethacrylate, have thus been resorted to in the art where intended applications do not require significant flexibility. However, it is possible to control the extent of shrinkage of individual cube corner elements upon solidification or curing through control of such variables as polymeric composition of the cube corner sheeting, composition and method of application of overlay material to the cube corner sheeting, and methods of manufacture. See, e.g., U.S. Pat. No. 4,668,558 (Barber).

The geometries of the cube corner schematics provided in FIGS. 1–3 are, as discussed above, merely exemplary of various geometries suitable for the production of efficient retroreflective sheeting. However, these sample configurations all typically demonstrate the presence of a significant amount of "land" in the microreplicated article. As a consequence, this type of construction most typically lends itself best toward applications which do not require a great degree of flexibility in the microreplicated article. Examples of such applications would be the traffic and safety signs discussed above. In these types of applications, the ultimate flexibility of the cube corner sheeting is less critical than in other applications in that the sheeting is normally adhered to rigid structures such as signs and license plates. Even for those applications where the cube corner sheeting must demonstrate a certain minimum level of flexibility, the desired degree of flexibility can sometimes be approached through careful control of the chemical composition of the cube corner sheeting material, and design variables such as the relative proportions of the dimensions of the land and the individual cube corner elements.

Even for applications requiring a relatively higher degree of flexibility of the cube corner sheeting, the necessary flexibility can sometimes be attained through choice of polymeric composition for the microreplicated article and/or through minimizing the thickness of the land. The flexibility contemplated here is generally sufficient to enable the cube corner sheeting to conform to non-rigid surfaces such as cloth or other plastic films, or to simple or complex curved surfaces with radii of curvature on the order of 2 to 3 centimeters ("cm"). However, this degree of "flexibility" is inadequate for a wide range of applications where the cube corner sheeting is applied to materials that undergo extreme and repetitive torsional stresses or extensive deformation for long periods of time between use. For example, such would be the case with retroreflective cube corner sheeting adhered to inflatable rubber life rafts which are typically stored in a folded and deflated condition between uses. Also within contemplation are other practical applications in which the cube corner sheeting and/or fabric or plastic material to which it is adhered are subject to severe twisting, wrinkling or other such deformation, either repeatedly or for extended periods of time.

Flexible fabric materials such as a trailer tarpaulin, or roll-up sign, will typically have a life span of about four to five years. The flexible covers are particularly convenient, permitting the operator of the vehicle to gain access to the trailers quickly, conveniently, and to allow the trailer compartment to maintain reasonable weatherproofing abilities. The truck operator may open and close a cover numerous times each day, therefore the cover should be not only flexible, but strong and durable. In such applications, the vehicle, and the cover with its adhered retroreflective material, will be subject to harsh weather conditions comprising extremes of temperature, chemical challenges from atmospheric pollutants and road salt, and photochemical reactions involving infrared, visible, and ultraviolet radiation. Such conditions are, of course, not exclusive to applications involving roll-up signs, but can be expected for many applications where retroreflective materials of the sort disclosed herein are used for extended periods of time in an outdoor environment. Under such conditions of wear and weathering, retroreflective materials must be able to maintain flexibility and strength, as well as optical properties, for the expected life of the underlying fabric or material. Although perhaps not as extreme as the conditions described above for vehicle applications, the conditions encountered for numerous other potential applications requiring extremely flexible cube corner retroreflective materials would require similar durability and persistent optical performance. Without the present invention, it has been extremely difficult to prepare and utilize composite materials incorporating cube corner retroreflective elements that are capable of satisfying these varied and demanding criteria.

Accordingly, for a wide range of practical applications, where typical levels of "flexibility" as achieved in the art are inadequate, there exists a need for a retroreflective cube corner construction that is ultra-flexible, mechanically durable in terms of its ability to recover from repeated or extended periods of severe distortion and/or distortional flex and, at the same time, maintain superior optical properties as defined by efficiency of retroreflection and superior appearance. Furthermore, given the nature of many of the possible applications that would benefit most from such an ultra-flexible, optically superior cube corner sheeting, there is a further need for this cube corner construction to be able to withstand long term exposure to wear and weathering without significant degradation of optical properties or retroreflective brightness.

SUMMARY OF THE INVENTION

The present invention provides composite retroreflective sheetings having very high flexibility and optical performance, a method for making such sheetings, and safety articles or devices comprising such sheetings.

In brief summary, microstructured composite sheetings (e.g., retroreflective composite cube corner sheetings) of the invention comprise: (a) a two dimensional array of substantially independent microstructure elements (e.g., cube corner elements), and (b) an overlay film having two major surfaces, the array being bonded to the first major surface of the overlay film and having zero to minimal land as described below. The array comprises a first, relatively rigid, polymeric material and the overlay film comprises a second, relatively more flexible polymeric material as described below. The microstructure elements are preferably cured in situ on the overlay film and the material of the cube corner elements and material of the overlay film preferably form an interpenetrating network.

Briefly summarizing, the method of the invention for making such composite sheetings comprises the steps of:

a) providing a tool having a molding surface with a plurality of cavities opening thereon suitable for forming desired microstructure elements (e.g., cube corner elements of a retroreflective article);

b) applying to the molding surface of the tool a volume of a flowable curable resin composition suitable for forming microstructure elements (e.g., retroreflective cube corner elements), the resin preferably being such that it shrinks when cured;

c) contacting the resin composition with a first major surface of an overlay film having first and second major surfaces; and d) minimizing, preferably uniformly, excess resin composition extending above the cavities and tool then e) curing the resin composition to form a composite sheeting comprising an array of microstructure elements (e.g., cube corner elements) bonded to the overlay film; then f) removing the sheeting from the tool; and g) applying mechanical stress to the sheeting so as to cause a fractured separation of substantially each individual microstructure element from surrounding microstructure elements, if they were connected by a land. The resin composition and overlay film are preferably such that when the resin composition contacts the overlay film it penetrates the overlay film so that after the primary curing treatment an interpenetrating network between the material of the microstructure elements and the material of the overlay film is formed.

Composite retroreflective sheetings of the invention provide a previously unattainable combination of high flexibility, optical performance, and durability, i.e., ability to retain a high degree of retroreflective brightness when subjected to mechanical and environmental stresses. Retroreflective sheetings with such a desirable combination of characteristics have numerous potential uses in applications where cube corner retroreflective sheetings were either not suitable, or in applications where improved performance is desired.

BRIEF DESCRIPTION OF DRAWING

The invention will be further explained with reference to the drawing, wherein.

Figure 1:
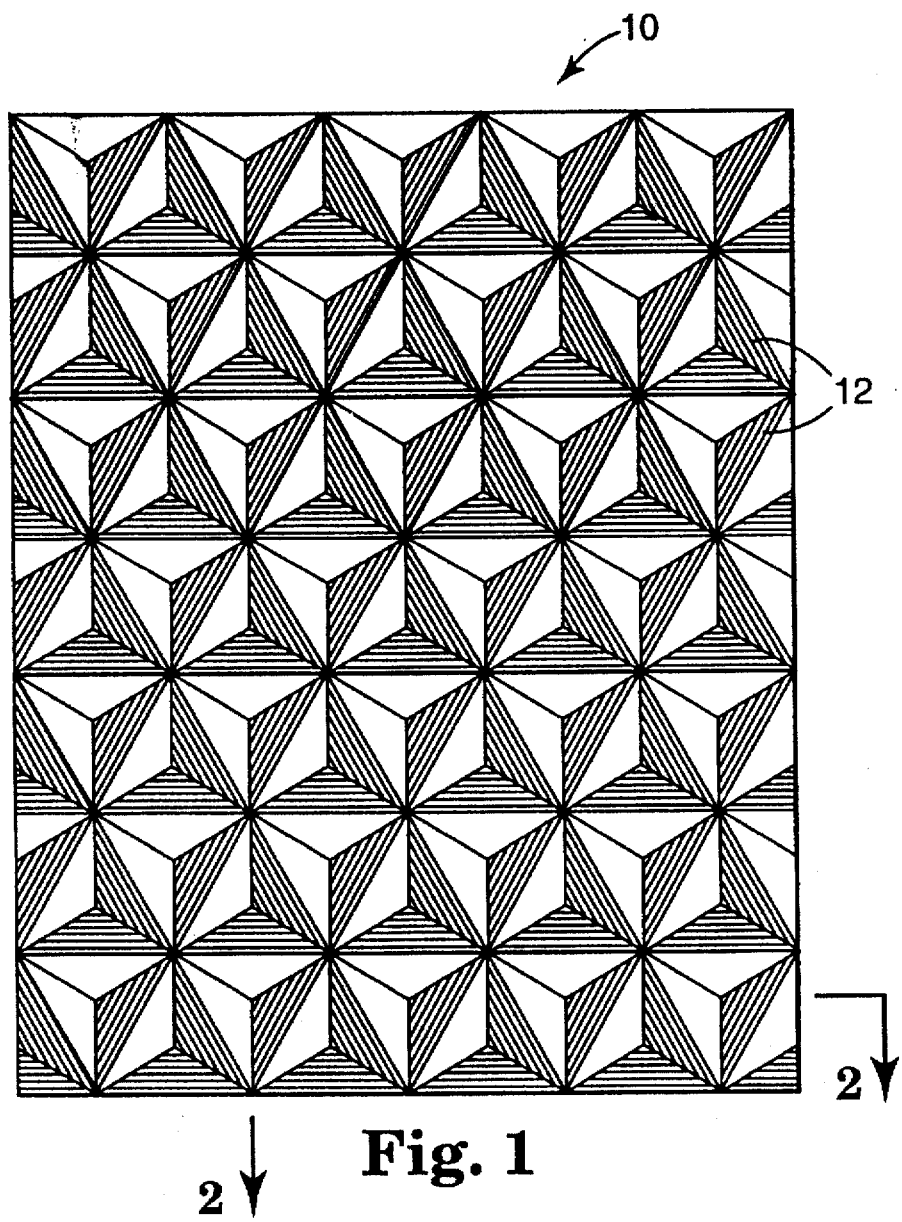
FIG. 1 is a top view of the back side of an illustrative array of cube corner elements.
Figure 2:
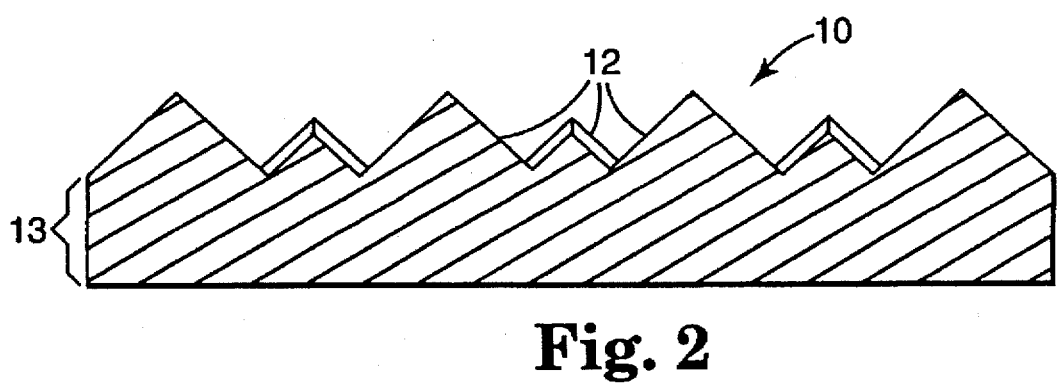
FIG. 2 is a cross-sectional view of the array of cube corner elements of FIG. 1.
Figure 3:
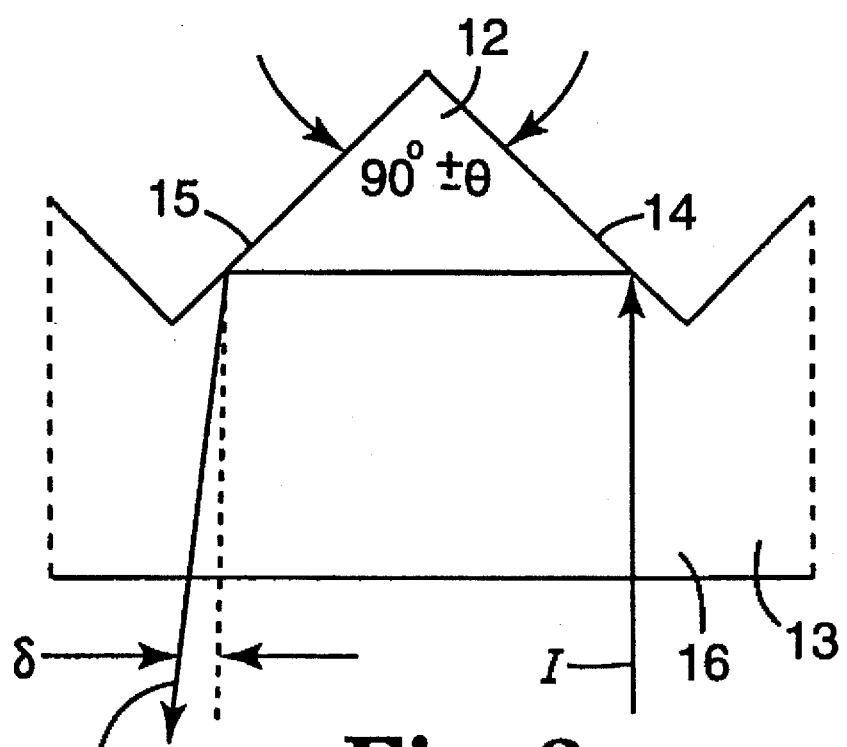
FIG. 3 is a schematic representation of a single retroreflective cube corner element illustrating the optics of retroreflection.

These figures, which are idealized and are not to scale, are intended to be merely illustrative and non-limiting.

DETAILED DESCRIPTION OF ILLUSTRATIVE EMBODIMENTS

As briefly outlined above, the method of the invention comprises the steps of:

a) providing a tool having a molding surface comprising a plurality of cavities opening thereon suitable for forming cube corner elements;

b) applying to the molding surface of the tool a volume of a flowable curable resin composition suitable for forming retroreflective cube corner elements, the resin preferably being such that it shrinks when cured;

c) contacting the resin composition with a first major surface of an overlay film having first and second major surfaces; and d) minimizing, preferably uniformly, excess resin composition extending above the cavities and tool; then e) curing the resin composition to form a composite sheeting comprising an array of cube corner elements bonded to the overlay film; then f) removing the sheeting from the tool; and g) applying mechanical stress to the sheeting so as to cause a fractured separation of substantially each individual cube corner element from surrounding cube corner elements. Any of steps a), b), c), and d) can be carried out in any desired order or simultaneously as desired. Steps f) and g) may also be carried out in any desired order or simultaneously as desired.

The resin composition and overlay film are preferably such that when the resin composition contacts the overlay film it penetrates the overlay film so that after the primary curing treatment an interpenetrating network between the material of the cube corner elements and the material of the overlay film is formed.

The tool has a molding surface having a plurality of cavities opening thereon which have the shape and size suitable for forming desired cube corner elements. The opening at the top surface of a cavity corresponds to the base of a resultant cube corner element. The cavities, and thus resultant cube corner elements, may be three sided pyramids having one cube corner each, e.g., such as are disclosed in the aforementioned U.S. Pat. No. 4,588,258, may have a rectangular base with two rectangular sides and two triangular sides such that each element has two cube corners each, e.g., such as are disclosed in U.S. Pat. No. 4,938,563 (Nelson et al.), or may be of other desired shape, having at least one cube corner each, e.g., such as are disclosed in U.S. Pat. No. 4,895,428 (Nelson et al.). It will be understood by those skilled in the art that any cube corner element may be used in accordance with the present invention. Although the invention is described with particular reference to cube corner elements, it will be understood that the present invention may be used with other microstructured replicated elements that are bonded to an overlay film in the manner of the cube corner element discussed herein.

As discussed above, a variety of techniques and methods have been developed for fabrication of cube corner type retroreflective articles. Any suitable technique for forming a desired array of cube corner elements, for example, pin bundling techniques and direct machining techniques, replication, etc. can be used to form the tool with appropriate molding surface, i.e., having a plurality of cavities, for use in the present invention.

The tool should be such that the cavities will not deform undesirably during fabrication of the composite article, and such that the array of cube corner elements can be separated therefrom after curing. Illustrative examples of substrates known to be useful for forming tools for replication of cube corner elements include materials that can be directly machined. Such materials preferably machine cleanly without burr formation, exhibit low ductility and low graininess, and maintain dimensional accuracy after groove formation. A variety of machinable plastics (including both thermoset and thermoplastic materials), e.g., acrylics, and machinable metals, preferably nonferrous, e.g., aluminum, brass, copper, and nickel are known. In many instances, it may be desired to use a first or later generation replicate of a machined or shaped surface as the tool (i.e., the member on which the cube corner sheeting of the invention is formed). Depending upon the tool used and the nature of the resin composition, the cured array may separate from the tool readily or a parting layer may be necessary to achieve desired separation characteristics. Illustrative examples of parting layer materials include an induced surface oxidation layer, an intermediate thin metallic coating, chemical silvering, combinations of different materials or coatings. If desired, suitable agents may be incorporated into the resin composition to achieve desired separation characteristics.

As discussed above, the tool can be made from polymeric, metallic, composite, or ceramic materials. In some embodiments, curing of the resin will be performed by applying radiation through the tool. In such instances, the tool should be sufficiently transparent to permit irradiation of the resin therethrough. Illustrative examples of materials from which tools for such embodiments can be made to include polyolefins and polycarbonates. Metal tools are typically preferred, however, as they can be formed in desired shapes and provide excellent optical surfaces to maximize retroreflective performance of a given cube corner element configuration.

A flowable resin is applied to the molding surface of the tool. The resin should be such that it flows, optionally with applied vacuum, pressure, or mechanical means, into the cavities in the molding surface. It is preferably applied in sufficient quantity that it at least substantially fills the cavities.

Critical to the practice of the invention is selection of appropriate polymeric materials for the cube corner element array and overlay film. Typically the array of cube corner elements preferably comprises a material that is thermoset or extensively crosslinked, and the overlay film preferably comprises a thermoplastic material. The superior chemical and mechanical properties of thermoset materials yield cube corner elements optimally capable of maintaining desired retroreflectivity.

In choosing the polymeric components of composite retroreflective materials of the present invention, it is essential to select compatible polymeric materials for the cube corner elements and overlay film. A preferred aspect of compatibility is that the material of the resin composition be capable of penetrating the overlay film and then cure in situ such that after curing an interpenetrating network between the material of the cube corner elements and the material of the overlay film is formed. A surprising aspect of this invention is that efficient optical performance can be obtained with such interpenetrating networks of bond between the cube corner elements and overlay film. Particular resin compositions and overlay films can be readily screened for penetration by application of a quantity of the resin composition to the surface of the overlay film. Priola, A., Gozzelino, G., and Ferrero, F., *Proceedings of the XIII International Conference in Organic Coatings Science and Technology*, Athens, Greece, Jul. 7-11, 1987, pp. 308-18, discloses a watch glass test suitable for this purpose.

A critical criterion in the selection of these components is the relative elastic modulus for each component. The term "elastic modulus" as used herein means the elastic modulus determined according to ASTM D882-75b using Static Weighing Method A with a 12.5 centimeter (5 inch) initial grip separation, a 2.5 centimeter (1 inch) sample width, and a 2.5 centimeter/minute (1 one inch/minute) rate of grip separation. As discussed above in relation to the fundamental principles behind the optical properties of cube corner elements, even slight distortion of the geometry of cube corner elements can result in substantial degradation of optical properties of the cube corner elements. Thus, higher elastic modulus materials are preferable for the cube corner elements due to their increased resistance to distortion. The overlay film of the composite retroreflective materials of the invention is preferably a polymeric material of somewhat lower elastic modulus. During the course of fabrication of the overlay film/cube corner array composite, individual cube corner elements bond to the overlay film. During curing of the cube corner component, depending on the composition of the cube corner material, individual cube corner elements may experience a certain degree of shrinking. If the elastic modulus of the overlay film is too high, torsional stresses can be applied to the cube corner elements if they shrink during curing. If the stresses are sufficiently high, then the cube corner elements can become distorted with a resulting degradation in optical performance. When the elastic modulus of the overlay film is sufficiently lower than the modulus of the cube corner element material, the overlay film can deform along with the shrinking of cube corner elements without exerting such deformational stresses on the cube corner elements that would lead to undesirable degradation of the optical characteristics.

Alternatively, the differential between the elastic modulus of the cube corner element and the overlay material need not be as great depending on the dimensions of the cube corner elements. When the cube corner elements are of lower height, the differential between the elastic modulus of the cube corner elements and the overlay film need not be as great, presumably because the smaller cube corner elements do not undergo as great a shrinkage during curing, as measured in absolute dimensional units, and the overlay film does not interact with the cube corner elements toward creation of torsional and dimensional stresses to as great an extent as with larger cube corner elements. In general, it is possible to state that the modulus differential between the overlay film and the cube corner elements should be on the order of 1.0 to $1.5 \times 10^7$ pascals or more. As the height of the cube corner elements diminishes, it is possible for this modulus differential to reach the low end of the range given immediately above. However, it should be kept in mind that there is a practical lower limit to the modulus of the cube corner element material. Below a certain level, generally on the order of about 2.0 to $2.5 \times 10^8$ pascals for cube corner elements about 175 microns (7 mils) in height, less for smaller cube corner elements, the cube corner elements become too flexible and do not possess sufficient mechanical rigidity to properly fracture upon application of a stress. The cube corner elements preferably have an elastic modulus of greater than about $25 \times 10^8$ pascals. Without such fracturing, the decoupling of the individual cube corner elements that is essential to the flexibility and the superior optical properties of the sheeting under stress cannot be reliably attained.

Aside from considerations concerning the relative elastic modulus between the cube corner elements and overlay film, there is a requirement of relatively low elastic modulus for the overlay film that is essential to achieve the desired degree of ultra-flexibility in the resulting composite retroreflective sheeting. As detailed above, the array of cube corner elements is formed with a minimal amount of land. Provided that the land can be sufficiently minimized, stretching or other suitable elastic distortion of the overlay film results in fracture of the land. This can be accomplished by application of elastic stress to the overlay film/cube corner array composite post-fabrication, or can result from the process of simply removing the composite sheeting from the fabrication apparatus. This represents considerable efficiency in fabrication in that significant post-casting operations to fracture more substantial lands to achieve the same effect are unnecessary, with resulting savings in fabrication costs.

After curing, the thickness of the land, i.e., the thickness of the cube corner array material opposite the plane defined by the bases of the cube corner elements, is preferably less than 10 percent of the height of the cube corner elements, and more preferably less than 1 percent thereof. In sheetings having thicker land portions, it is typically more difficult to achieve decoupling of individual cube corner elements, thereby rendering the resultant product less flexible, or to achieve decoupling without damaging the material in substantial portions of the bases of the cubes, thereby reducing the retroreflective performance of the resultant sheeting. In addition, if the land is too thick, there may be a tendency for cracks to propagate across the base of the cube corner elements, thereby reducing the optical performance of the sheeting, rather than between individual cube corner elements as desired for decoupling of the elements. Thickness of the land can be controlled by controlling the amount of flowable resin composition applied to the tool, removing excess resin composition, e.g., with a doctor blade, applying pressure to the overlay film so as to squeeze out excess composition, etc.

The resin composition is preferably one that will shrink upon curing. Preferably the resin will shrink at least 5 percent by volume when cured, more preferably between 5 and 20 percent by volume, when cured. It has been found that by using resin compositions of this type in accordance with the invention, cube corner arrays with minimal or no land thickness can be more easily formed, thereby achieving the high flexibility which is desired. For instance, resin compositions that shrink when cured will tend to retreat into the cube corner-shaped cavity, tending to leave a land that only connects adjacent cavities and therefor adjacent cube corners with a narrow portion if applied to the tool in appropriate quantities. The narrow portion is readily broken resulting in decoupling of individual cube corner elements as discussed below. Sheetings of the invention can in theory be formed with essentially no land connecting adjacent cube corner elements, however, in typical high volume manufacturing arrangements, a minimal land having a thickness of up to 10 percent of the height of the cubes, preferably on the order of 1 to 5 percent, will be formed.

Resins selected for use in the array of cube corner elements preferably yield resultant products that provide highly efficient retroreflection as well as sufficient durability and weatherability. Illustrative examples of suitable polymers include acrylic, polycarbonate, polyester, polyethylene, polyurethane, and cellulose acetate butyrate polymers. Polymers such as poly(carbonate), poly (methylmethacrylate), polyethylene terephthalate, aliphatic polyurethane, and cross-linked acrylate such as mono- or multi-functional acrylates or acrylated epoxies, acrylated polyesters, and acrylated urethanes blended with mono- and multi-functional monomers are typically preferred. These polymers are typically preferred for one or more of the following reasons: high thermal stability, environmental stability, and clarity, excellent release from the tooling or mold, and high receptivity for receiving a reflective coating.

Other illustrative examples of materials suitable for forming the array of cube corner elements are reactive resin systems capable of being cross-linked by a free radical polymerization mechanism by exposure to actinic radiation, for example, electron beam, ultraviolet light, or visible light. Additionally, these materials may be polymerized by thermal means with the addition of a thermal initiator such as benzoyl peroxide. Radiation-initiated cationically polymerizable resins also may be used. Reactive resins suitable for forming the array of cube corner elements may be blends of photoinitiator and at least one compound bearing an acrylate group. Preferably the resin blend contains a monofunctional, a difunctional, or a polyfunctional compound to ensure formation of a cross-linked polymeric network upon irradiation.

Illustrative examples of resins that are capable of being polymerized by a free radical mechanism that can be used herein include acrylic-based resins derived from epoxies, polyesters, polyethers, and urethanes, ethylenically unsaturated compounds, aminoplast derivatives having at least one pendant acrylate group, isocyanate derivatives having at least one pendant acrylate group, epoxy resins other than acrylated epoxies, and mixtures and combinations thereof. The term acrylate is used here to encompass both acrylates and methacrylates. U.S. Pat. 4,576,850 (Martens) discloses examples of crosslinked resins that may be used in cube corner element arrays of the present invention.

Ethylenically unsaturated resins include both monomeric and polymeric compounds that contain atoms of carbon, hydrogen and oxygen, and optionally nitrogen, sulfur, and the halogens may be used herein. Oxygen or nitrogen atoms, or both, are generally present in ether, ester, urethane, amide, and urea groups. Ethylenically unsaturated compounds preferably have a molecular weight of less than about 4,000 and preferably are esters made from the reaction of compounds containing aliphatic monohydroxy groups, aliphatic polyhydroxy groups, and unsaturated carboxylic acids, such as acrylic acid, methacrylic acid, itaconic acid, crotonic acid, iso-crotonic acid, maleic acid, and the like. Such materials are typically readily available commercially and can be readily cross linked.

Some illustrative examples of compounds having an acrylic or methacrylic group that are suitable for use in the invention are listed below:

(1) Monofunctional compounds:
ethylacrylate, n-butylacrylate, isobutylacrylate, 2-ethylhexylacrylate, n-hexylacrylate, n-octylacrylate, isooctyl acrylate, bornyl acrylate, tetrahydrofurfuryl acrylate, 2-phenoxyethyl acrylate, and N,N-dimethylacrylamide;

(2) Difunctional compounds:
1,4-butanediol diacrylate, 1,6-hexanediol diacrylate, neopentylglycol diacrylate, ethylene glycol diacrylate, triethyleneglycol diacrylate, tetraethylene glycol diacrylate, and diethylene glycol diacrylate; and (3) Polyfunctional compounds:
trimethylolpropane triacrylate, glyceroltriacrylate, pentaerythritol triacrylate, pentaerythritol tetraacrylate, and tris(2-acryloyloxyethyl)isocyanurate. Monofunctional compounds typically tend to provide faster penetration of the material of the overlay film and difunctional and polyfunctional compounds typically tend to provide more crosslinked, stronger bonds at the interface between the cube corner elements and overlay film. Some representative examples of other ethylenically unsaturated compounds and resins include styrene, divinylbenzene, vinyl toluene, N-vinyl formamide, N-vinyl pyrrolidone, N-vinyl caprolactam, monoallyl, polyallyl, and polymethallyl esters such as diallyl phthalate and diallyl adipate, and amides of carboxylic acids such as N,N-diallyladipamide.

Illustrative examples of photopolymerization initiators that can be blended with acrylic compounds in cube corner arrays of the present invention include the following: benzil, methyl o-benzoate, benzoin, benzoin ethyl ether, benzoin isopropyl ether, benzoin isobutyl ether, etc., benzophenone/ tertiary amine, acetophenones such as 2,2-diethoxyacetophenone, benzyl methyl ketal, 1-hydroxycyclohexylphenyl ketone, 2- hydroxy-2-methyl-1-phenylpropan-1-one, 1-(4-isopropylphenyl)-2-hydroxy-2-methylpropan-1-one, 2-benzyl-2-N,N-dimethylamino-1-(4-morpholinophenyl)-1-butanone, 2,4,6-trimethylbenzoyldiphenylphosphine oxide, 2-methyl-1-4(methylthio), phenyl-2-morpholino-1-propanone, bis(2,6-dimethoxybenzoyl)(2,4,4-trimethylpentyl)phosphine oxide, etc. The compounds may be used individually or in combination.

Cationically polymerizable materials including but are not limited to materials containing epoxy and vinyl ether functional groups may be used herein. These systems are photoinitiated by onium salt initiators, such as triarylsulfonium, and diaryliodonium salts.

Preferably, the overlay film used in the method of the present invention is a polymeric material selected from the group consisting of ionomeric ethylene copolymers, plasticized vinyl halide polymers, acid functional polyethylene copolymers, aliphatic polyurethanes, aromatic polyurethanes, other light transmissive elastomer, and combinations thereof. Such materials typically provide overlay films that are impart desired durability and flexibility to the resultant retroreflective sheeting while permitting desired preferred penetration by the cube corner element resin composition.

The overlay film preferably comprises a low elastic modulus polymer, e.g., less than about $13 \times 10^8$ pascals, to impart easy bending, curling, flexing, conforming, or stretching to the resultant retroreflective composite. Generally, the overlay film comprises polymer having a glass transition temperature less than about 50° C. The polymer preferably is such that the overlay film retains its physical integrity under the conditions it is exposed to as the resultant composite retroreflective sheeting is formed. The polymer desirably has a Vicat softening temperature that is greater than 50° C. The linear mold shrinkage of the polymer desirably is less than 1 percent, although certain combinations of polymeric materials for the cube corner elements and the overlay will tolerate a greater extent of shrinking of the overlay material. Preferred polymeric materials used in the overlay are resistant to degradation by UV light radiation so that the retroreflective sheeting can be used for long-term outdoor applications. The overlay film should be light transmissive and preferably is substantially transparent. For instance, films with a matte finish that become transparent when the resin composition is applied thereto, or that only become transparent during the fabrication process, e.g., in response to the curing conditions used to form the array of cube corner elements, are useful herein.

The overlay film may be either a single layer or multilayer component as desired. If multilayer, the layer to which the array of cube corner elements is bonded should have the properties described herein as useful in that regard with other layers not in contact with the array of cube corner elements having selected characteristics as necessary to impart desired characteristics to the resultant composite retroreflective sheeting.

The overlay film should be sufficiently elongatable to achieve decoupling of the cube corner elements as discussed herein. It may be elastomeric, i.e., tend to recover to at least some degree after being elongated, or may have substantially no tendency to recover after being elongated, as desired. Illustrative examples of polymers that may be employed in overlay films herein include:

(1) Fluorinated polymers such as:
  poly(chlorotrifluoroethylene), for example KEL-F800 Brand available from Minnesota Mining and Manufacturing, St. Paul, Minn.;
  poly(tetrafluoroethylene-co-hexafluoropropylene), for example EXAC FEP Brand available from Norton Performance, Brampton, Mass.;
  poly(tetrafluoroethylene-co-perfluoro(alkyl) vinylether), for example, EXAC PEA Brand also available from Norton Performance; and
  poly(vinylidene fluoride-co-hexafluoropropylene), for example, KYNAR FLEX-2800 Brand available from Pennwalt Corporation, Philadelphia, Pa.;

(2) Ionomeric ethylene copolymers such as:
  poly(ethylene-co-methacrylic acid) with sodium or zinc irons such as SURLYN-8920 Brand and SURLYN-9910 Brand available from E.I. duPont Nemours, Wilmington, Del.;

(3) Low density polyethylenes such as: low density polyethylene; linear low density polyethylene; and very low density polyethylene;

(4) Plasticized vinyl halide polymers such as plasticized poly(vinychloride);

(5) Polyethylene copolymers including: acid functional polymers such as poly(ethylene-co-acrylic acid) and poly(ethylene-co-methacrylic acid) poly(ethylene-co-maleic acid), and poly(ethylene-co-fumaric acid); acrylic functional polymers such as poly(ethylene-co-alkylacrylates) where the alkyl group is methyl, ethyl, propyl, butyl, et cetera, or $CH_3(CH_2)n-$ where n is 0 to 12, and poly(ethylene-co-vinylacetate); and (6) Aliphatic and aromatic polyurethanes derived from the following monomers (1)–(3): (1) diisocyanates such as dicyclohexylmethane-4,4'-diisocyanate, isophorone diisocyanate, 1,6-hexamethylene diisocyanate, cyclohexyl diisocyanate, diphenylmethane diisocyanate, and combinations of these diisocyanates, (2) polydiols such as polypentyleneadipate glycol, polytetramethylene ether gylcol, polycaprolactonediol, poly-1,2-butylene oxide glycol, and combinations of these polydiols, and (3) chain extenders such as butanediol and hexanediol. Commercially available urethane polymers include: PN-04, or 3429 from Morton International Inc., Seabrook, N.H., or X-4107 from B. F. Goodrich Company, Cleveland, Ohio.

Combinations of the above polymers also may be employed in the overlay film. Preferred polymers for the overlay film include: the ethylene copolymers that contain units that contain carboxyl groups or esters of carboxylic acids such as poly(ethylene-co-acrylic acid), poly(ethylene-co-methacrylic acid), poly(ethylene-co-vinylacetate); the ionomeric ethylene copolymers; plasticized poly (vinylchloride); and the aliphatic urethanes. These polymers are preferred for one or more of the following reasons: suitable mechanical properties, good adhesions to the cube corner layer, clarity, and environmental stability.

Colorants, ultraviolet ("UV") absorbers, light stabilizers, free radical scavengers or antioxidants, processing aids such as antiblocking agents, releasing agents, lubricants, and other additives may be added to one or both of the retroreflective layer and overlay film if desired. The particular colorant selected depends on the desired color; colorants typically are added at about 0.01 to 0.5 weight percent. UV absorbers typically are added at about 0.5 to 2.0 weight percent. Illustrative examples of suitable UV absorbers include derivatives of benzotriazole such as TINUVIN Brand 327, 328, 900, 1130, TINUVIN-P Brand, available from Ciba-Geigy Corporation, Ardsley, N.Y.; chemical derivatives of benzophenone such as UVINUL Brand M40, 408, D-50, available from BASF Corporation, Clifton, N.J.; SYNTASE Brand 230, 800, 1200 available from Neville-Synthese Organics, Inc., Pittsburgh, Pa.; or chemical derivatives of diphenylacrylate such as UVINUL Brand N35, 539, also available from BASF Corporation of Clifton, N.J. Light stabilizers that may be used include hindered amines, which are typically used at about 0.5 to 2.0 weight percent. Examples of hindered amine light stabilizers include TINUVIN Brand 144, 292, 622, 770, and CHIMASSORB Brand 944 all available from the Ciba-Geigy Corp., Ardsley, N.Y. Free radical scavengers or antioxidants may be used, typically, at about 0.01 to 0.5 weight percent. Suitable antioxidants include hindered phenolic resins such as IRGANOX Brand 1010, 1076, 1035, or MD-1024, or IRGAFOS Brand 168, available from the Ciba-Geigy Corp., Ardsley, N.Y. Small amounts of other processing aids, typically no more than one weight percent of the polymer resins, may be added to improve the resin's processibility. Useful processing aids include fatty acid esters, or fatty acid amides available from Glyco Inc., Norwalk, Conn., metallic stearates available from Henkel Corp., Hoboken, N.J., or WAX E Brand available from Hoechst Celanese Corporation, Somerville, N.J.

If desired, the polymeric materials of the retroreflective sheeting may also contain substances such as flame retardants that optimize the overall properties of the resultant sheeting as well as articles to which it is attached.

Figure 4:
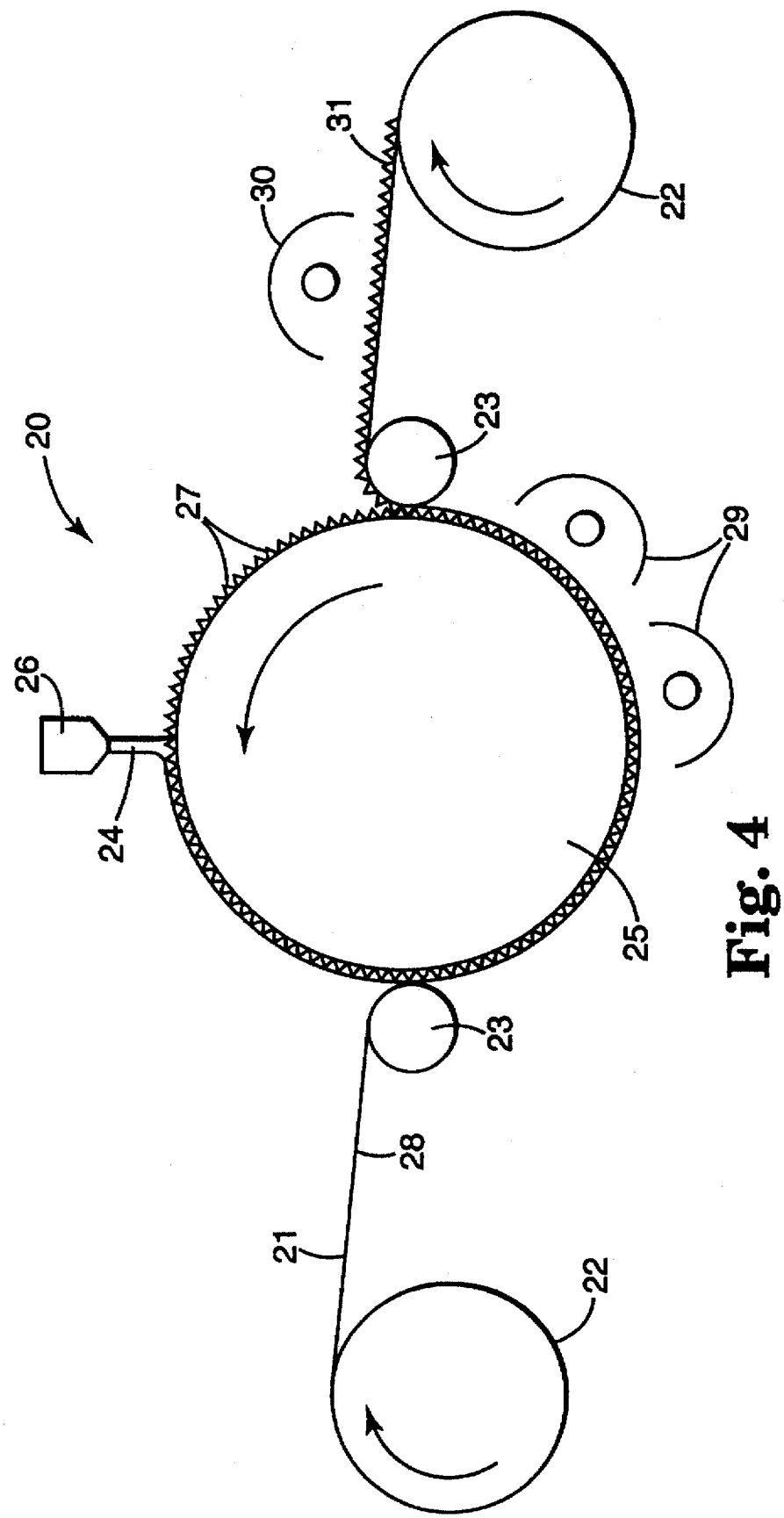
FIG. 4 is a schematic representation of an illustrative process configuration for practice of the method of the present invention.
Figure 5:
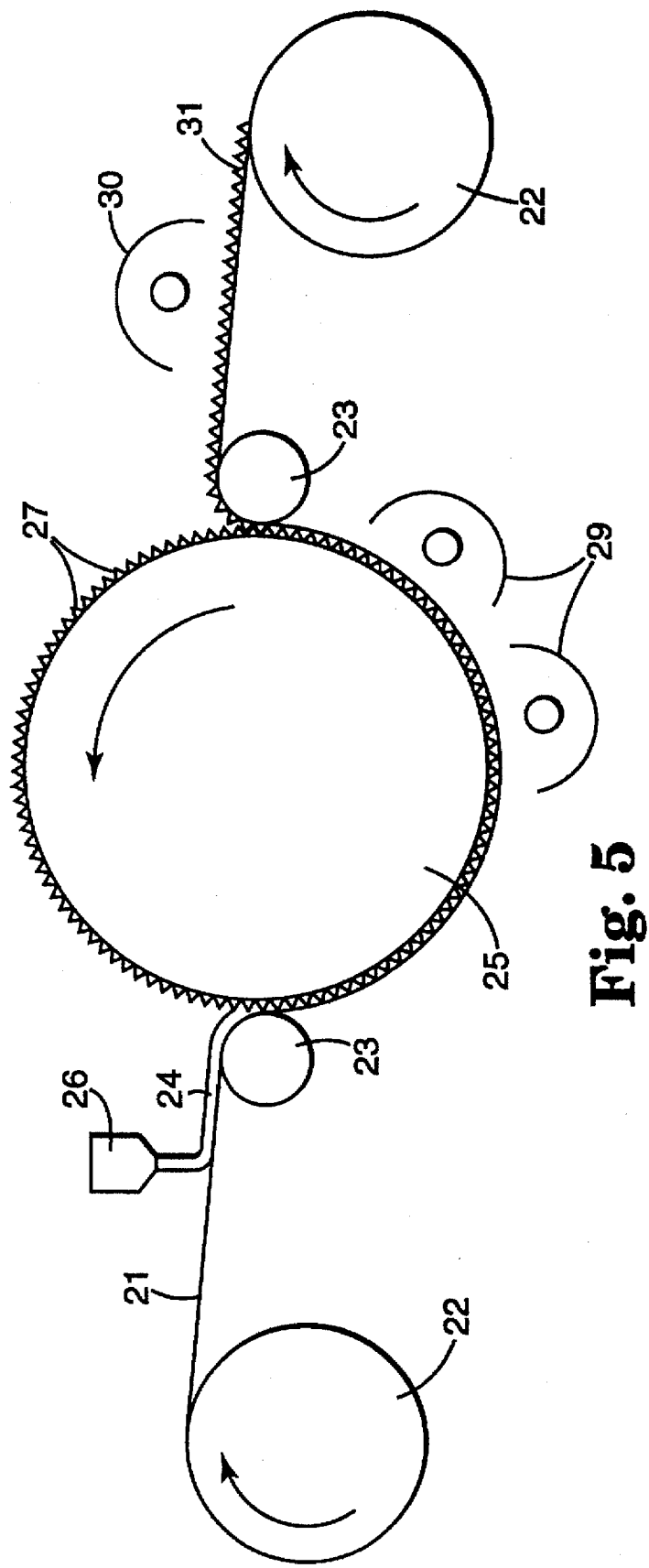
FIG. 5 is a schematic representation of an alternative illustrative process configuration for practice of the method of the present invention.

Referring now to FIGS. 4 and 5, it will be apparent to one of ordinary skill in the appropriate art of fabricating retroreflective cube corner sheeting that there are many suitable configurations for casting and curing sheeting in accordance with the present invention. For example, referring specifically to FIG. 4, there is a schematic for an apparatus, shown generally as 20, for casting and curing composite sheeting according to the method of the present invention. As shown in FIG. 4, overlay film 21 is drawn along guiding roller 22 to nip roller 23, e.g., a rubber coated roller, where overlay film 21 contacts suitable resin formulation 24 previously applied to patterned tool roll 25 through coating die 26. The excess resin extending above the cube corner element forming cavities 27 of tool 25 is minimized by setting nip roller 23 to a width setting that is effectively less than the height of the cube corner forming elements of tool 25. In this fashion, mechanical forces at the interface between nip roller 23 and tool 25 ensure that a minimum amount of resin 24 extends above cavities 27 of tool 25. Depending on the flexibility of overlay film 21, film 21 may be optionally supported with suitable carrier film 28 that provides structural and mechanical durability to overlay film 21 during casting and curing, and which is stripped from overlay film 21 after the sheeting is removed from tool 25. Use of such a carrier film is particularly preferred for low modulus overlay films.

The resin composition that forms the retroreflective array of cube corner elements can be cured in one or more steps. As shown in FIG. 4, radiation sources 29 expose the resin to actinic radiation, e.g., ultraviolet light, visible light, etc. depending upon the nature of the resin, in a primary curing step. As FIG. 4 illustrates, in this embodiment the actinic radiation from radiation source 29 irradiates the resin through overlay film 21, thus imposing a requirement that the overlay film be "transparent" to the radiation in order for curing of the resin to be effected. As used in this sense, the term "transparent" means that the film must allow an effective proportion of the actinic radiation impingent upon the film to be transmitted to the resin on the tool in order for curing to be accomplished at a practical rate. As can be appreciated by one of skill in the art, the selected overlay film need not be completely or 100 percent transparent to all possible wavelengths of actinic radiation that may be used in curing the resin. If the proportion of actinic radiation that is transmitted through the overlay film is relatively low, that can be compensated for, within limits, by a slower rate of feeding components through the formulation system, selection of resin composition, incorporation of selected photoinitiator(s) in the resin composition, etc. Alternatively, curing can be performed by irradiation through tool 25 if a tool that is sufficiently transparent to the selected radiation type is used. If desired, curing through both the tool and overlay film may be used if desired.

In instances where the resin composition will penetrate the overlay film as is preferred, the primary curing step is typically completed, and in some instances begun, after the resin composition from which the cube corner elements is formed has penetrated the overlay film to provide the desired interpenetrating network.

The primary curing can essentially completely cure the cube corner elements, or merely partially cure the resin composition to a sufficient degree that the cube corner elements are dimensionally stable and no longer require the support of the tool. The sheeting can then be removed from the tool, exposing the cube corner elements. One or more secondary curing treatments, selected depending upon the nature of the resin, can then be applied to fully cure the array of cube corner elements and strengthen the bond between the array of cube corner elements and the overlay film. This bifurcated curing approach can permit optimized processes and materials. For instance a sheeting made with an overlay containing ultraviolet absorbers (to impart greater durability and weathering ability) can be made by applying a primary curing treatment of visible light through the transparent overlay film, then removing the sheeting from the tool and applying a second curing treatment of ultraviolet radiation to the exposed cube corner elements. Such a bifurcation approach can permit faster overall production.

As shown in FIG. 4, second radiation source 30 can be configured to cure the resin after sheeting 31 has been removed from tool 25. The extent of the second curing step is dependent on a number of variables, among them the rate of feed-through of the materials, composition of the resin, nature of the crosslinking initiators used in the resin formulation, and the geometry of the tool. In general, the faster the rate of feed-through of the materials, the greater likelihood that more than one curing step will be needed. As encompassed by the method of the present invention, the first and second curing steps can consist of exposure of the sheeting to either ultraviolet and/or visible radiation.

Selection of types curing treatment will depend in large part upon the specific resin composition chosen for formation of the cube corner elements. Illustrative examples include electron beam exposure and actinic radiation, e.g., ultraviolet radiation, visible light radiation, and infrared radiation.

In addition to curing treatments, the method of the invention may further comprise heat treatment of the sheeting after it is removed from the tool and the array of cube corner elements are decoupled. Such heating serves to relax stresses that might have developed in the overlay film or cube corner elements, and to drive off unreacted moieties and by-reaction products. Typically, such treatment involves heating the sheeting to an elevated temperature, e.g., above the glass transition temperature of the subject resin. Typically a sheeting will exhibit an increase in retroreflective brightness after such treatment.

An advantage of the present invention is that the composite retroreflective cube corner materials of the invention are characterized by unusually high bond strength between the cube corner elements and the overlay film. When examined with an electron microscopy, some sheetings of the invention were found not to exhibit a clear interface between the dissimilar polymeric materials of the overlay film and the cube corner elements. Instead, a blurred boundary between the two materials was observed. This interpenetration effectively results in a composite material that, in the region of the interface between the overlay film and independent cube corner element, i.e., the transition zone, does not have a well-defined interface between cube corner resin and overlay resin but exhibits a higher cohesive strength than a clear, well-defined interface between two separate, dissimilar materials.

Relative to many previously known retroreflective cube corner sheetings, composite sheetings of the invention are characterized by an extremely high level of adhesion between the dissimilar overlay film and cube corner elements. The extent of adhesion between the overlay layer and the cube corner element layer is sufficient that no additional interlayer, in the form of a tie layer or an adhesive layer, is necessary to achieve sufficient mechanical stability. Indeed, the level of adhesion between the layers is great enough that for many embodiments it is impossible, on a practical level, to measure such level of adhesion through standard tests such as peel strength tests. This is because as peel forces are increased failure of the multi-layer composite sheeting occurs not at the interface between the overlay film and the array of cube corner elements, but elsewhere within the sheeting, e.g., between individual cube corner elements at other interfaces. In essence, the failure limit under such test conditions is a function of the inherent tensile and cohesive strength of the overlay film.

Due to the decoupled, independent nature of the cube corner elements and strong bond of each independent element to the overlay film, composite retroreflective sheetings of the invention retain surprisingly high levels of retroreflective performance after undergoing mechanical deformation stresses. Essential to the method of the present invention is application of mechanical stresses to the sheeting sufficient to result in the fracturing of the minimal land, if any, that exists between the individual cube corner elements of the sheeting. The immediate practical result of the application of this mechanical stress is the decoupling of each individual cube corner element from the surrounding elements. The resulting network of independent cube corner elements in the sheeting of the present invention provides the significant advantages not heretofore found in the retroreflective cube corner sheetings. Application of mechanical stresses sufficient to result in fracture of interconnecting land and creation of independent cube corner elements need not necessarily be carried out as a distinct method step subsequent to removal of the sheeting from the tool. The mechanical stresses applied while removing the sheeting from the tool, and/or removing the optional backing film from the overlay film if used, may be sufficient in some instances to result in desired decoupling of the cube corner elements. This is advantageous in that additional process steps such as flexing or stretching may not have to be incorporated in the method of manufacture, with practical savings in time and expense resulting from the simplicity of the technique. Stresses are preferably applied in both X and Y directions within the array.

Preferably the land, if any, surrounding essentially all of the cube corner elements will be fractured such that that they are all completely decoupled from adjacent elements. It will be understood, however, that some of the advantages of the invention may be achieved when the cube corner elements are only substantially independent, i.e., if minor portions of the land remain unfractured.

An alternative configuration for the apparatus used for the casting and curing of the retroreflective sheeting of the present invention is illustrated in FIG. 5. Resin composition 24 is cast directly onto overlay film 21. The resin/film combination is then contacted with patterned tool roll 25 with pressure being applied through appropriate setting of nip roller 23. As in the configuration illustrated in FIG. 4, nip roller 23 serves to minimize the amount of resin extending above the cube corner forming cavities 27 of tool 25. The land, thus minimized, requires less subsequent manipulation to result in the fracture necessary to decouple the individual cube corner elements from their surrounding neighbors. The resin can be cured by exposure to actinic radiation from a first radiation source 29, and optional second radiation source 30. As configured in FIG. 5, the actinic radiation from first radiation source 29 must first pass through overlay film of the sheeting before impinging on the resin. As should be apparent upon a comparison of the configurations as depicted in FIG. 4 and 5, the practice of the method of the present invention need not depend on any specific sequence of method steps. Selection of order of individual process steps, many of which can be carried out either sequentially or simultaneously, will depend upon the specific formulations and configuration of apparatus utilized.

In a composite retroreflective sheeting of the invention, the individual cube corner optical elements are essentially totally decoupled from each other and from the overlay film, thereby providing several significant advantages. A major advantage is the ultra-flexible character of the composite retroreflective sheetings. The decoupled cube corner elements are no longer mechanically constrained by the effect of the land. This insulates the optically critical cube corner elements from mechanical stresses that might tend to deform them and lead to degradation of retroreflective performance. With less-flexible, previously known sheetings, stress applied to the sheet would tend to deform cube corner elements and degrade the retroreflective performance of the sheet. In addition to the surprising combination of flexibility and retroreflective brightness provided by sheeting of the invention, they are more resistant to degradation due to localized stresses than were previously known retroreflective sheetings.

Typically composite retroreflective composite sheetings of the invention will exhibit a retroreflective brightness, i.e., a coefficient of retroreflection, of greater than about 50, preferably greater than about 250, and more preferably greater than about 500, candela/lux/square meter, measured at an entrance angle of −4° and an observation angle of −0.2°, when the sheeting is in a planar, non-deformed configuration. By planar it is meant that the sheeting is permitted to lay flat and by non-deformed it is meant that the sheeting has not be mechanically stressed after decoupling of the cube corner elements.

An advantage of the present invention is that the composite retroreflective sheetings retain a surprising degree of retroreflective brightness after being deformed, i.e., stretched and/or flexed. In contrast, previously known cube corner retroreflective sheetings exhibited a substantial loss in retroreflective brightness when subjected to mechanical deformation forces. Typically, sheetings of the invention will exhibit a coefficient of retroreflection of greater than about 50, preferably greater than 200, candela/lux/square meter, measured at an entrance angle of −4° and an observation angle of 0.2°, when the sheeting is in a planar, deformed configuration, e.g., stretched to at least 110 percent in a linear dimension. Preferably, sheetings of the invention retain at least 30, more preferably at least 50 percent of their initial retroreflective brightness when deformed in this manner and held in that configuration. Preferably substantially recoverable retroreflective sheeting of the invention will retain at least 75 percent of its initial brightness when permitted to recover. As will be understood by those skilled in the art, depending upon the properties of the overlay film, after being stretched, sheeting of the invention may tend to remain in the elongated dimension or may tend to recover toward its unstretched dimension after elongation.

An advantage of the invention is that as a result of the decoupling of individual cube corner elements as provided herein, during and after elongation individual cube corner elements typically tend to remain effective retroreflective elements. Some loss of retroreflective brightness as a result of greater spacing of the cube corner elements can not be avoided. The overlay film is preferably one that will not lose its transparency, e.g., by stress whitening as some resins do, when the sheeting is deformed.

In addition, retroreflective sheeting of the invention preferably displays a retroreflective brightness of greater than about 50 candela/lux/square meter, measured at an entrance angle of −10° and an observation angle of 0.15°, when the sheeting is in a non-planar, deformed configuration, wherein the configuration is defined as an elongation to 150 percent of original length over a radius of curvature of about 150 millimeters ("mm"). ASTM No. E12.08 discloses such a test.

If desired, the cube corner elements may be coated with a reflective material on the surface opposed to the overlay film, e.g., aluminum, silver, or dielectric materials as are known in the art of cube corner retroreflective articles. The layer of reflective material should not interfere with decoupling of the cube corner elements, i.e., it preferably readily separates at the edges of adjacent cubes. Typically as a result of the thin nature of such coatings, they do not exhibit substantial tensile strength. The reflective material may cover all of the cube corner elements in the array or only some as desired. Combinations of different reflective materials or no reflective material in different portions of the array may be used if desired.

Typically it will be desired that the composite retroreflective sheeting further comprise a sealing layer adhered to the retroreflective layer on a surface opposite the overlay film such as is disclosed in U.S. Pat. No. 4,025,159. Preferably, the sealing layer comprises a thermoplastic material. Illustrative examples include ionomeric ethylene copolymers, plasticized vinyl halide polymers, acid functional polyethylene copolymers, aliphatic polyurethanes, aromatic polyurethanes, and combinations thereof. In certain applications, this optional sealing layer can provide significant protection for the cube corner elements of the composite material from environmental effects, as well as maintaining a sealed air layer around the cube corner elements which is essential for creating the refractive index differential needed for total internal reflection.

As a result of the decoupling of cube corner elements provided in the invention, the sealing layer can be adhered, at least in part, directly to the overlay film between independent cube corner elements, typically in a pattern of sealing regions or legs thereby creating cells comprising a plurality of retroreflective cube corner elements. Illustrative examples of sealing techniques include radio frequency welding, a conductive heat sealing process, ultrasonic welding, and reactive components, e.g., a sealing material that will develop a bond to the overlay film. Selection of a sealing approach will depend in large part on the nature of the sealing layer and overlay film.

When applying a sealing layer to composite retroreflective materials, whether to impart color, improved optical properties, or protection against environmental factors, considerable attention must be paid to the composition and physical properties of the individual component layers. The composition of individual component layers must be compatible with the methods used for fusing the sealing layer to the composition. Preferably, the sealing layer shall comprise a thermoplastic material. Such materials lend themselves well to fusing via relatively simple and commonly available thermal techniques.

The general practice followed in the art for sealing a thermoplastic layer to a retroreflective cube corner material is to use thermal embossing techniques which result in a form of "chain link" pattern of sealed zones which create sealed pockets of a plurality of individual cube corner elements. Closer inspection of a portion of a leg or "link" of a thermally sealed area indicates that for thermoplastic cube corner elements, the thermal fusion process results in significant distortion of the cube corner elements in fusion zones. This type of thermal distortion of the sealing legs typically extends well beyond the zone of actual sealing due to conductive effects. If an appreciable number of individual cube corner elements in the material are so distributed, the overall optical properties of the sheeting can decrease significantly, e.g., 30 to 40 percent, in comparison to unsealed sheeting.

Radio frequency ("RF") welding is an alternative to thermal fusion. RF welding through the fusion through the presence of polymer polar groups converting the radio frequency energy into kinetic motion which heats the polymer. When a radio frequency field is applied to a thermoplastic polymer with polar groups, the tendency of the polar groups to switch orientation in phase with the radio frequency determines the degree to which RF energy is absorbed and converted to kinetic motion of the polar group. This kinetic energy is conducted as heat to the entire polymer molecule; if enough RF energy is applied, the polymer will heat sufficiently to melt. A useful measure in determining the degree to which a polymer will absorb energy from an alternating field is the relation of the polymer's dielectric constant and the dielectric dissipation factor known as the loss factor and is given by the following relationship:

$$N=5.55\times10^{-13}(f)(\Im^2)(K)(\tan\delta); \qquad \text{Eq. 1}$$

where N is the electric loss in watts/cm$^3$-sec, $f$ is frequency in Hertz/sec, $\Im$ is field strength in volts/cm, K is the dielectric constant, and $\delta$ is the loss angle (tan$\delta$ is the dissipation factor). This dissipation factor is the ratio of the in-phase to out-of-phase power. If the polar groups in a thermoplastic polymer have a relative inability to switch orientations in the RF field, this results in a phase lag; known as the loss factor. The higher the dissipation factor, the greater the amount of heat a RF field will generate. Studies with thermoplastic polymers and radio frequency welding have demonstrated that thermoplastic polymers with dissipation factors of approximately 0.065 or higher will form useful welds. For example, polyvinyl chloride has a dissipation factor of approximately 0.09 to 0.10 at 1 megahertz ("MHz"), nylon caprolactam has a dissipation factor of 0.06 to 0.09 and polycarbonate has a dissipation factor of only 0.01. The respective dielectric constants for these three compounds are 3.5, 6.4, and 2.96, respectively, at 1 MHz. Polyethylene, polystyrene, and polycarbonate have very low dissipation factors and in practical use have poor radio frequency welding capability. The polyvinyl chlorides, polyurethanes, nylon, and polyesters have reasonably high dissipation factors and have been found in practical use to form very functional RF welds. Reference is made to the article "RF Welding and PVC and Other Thermoplastic Compounds" by J. Leighton, T. Brantley, and E. Szabo in ANTEC 1992, pps. 724–728.

Figure 8:
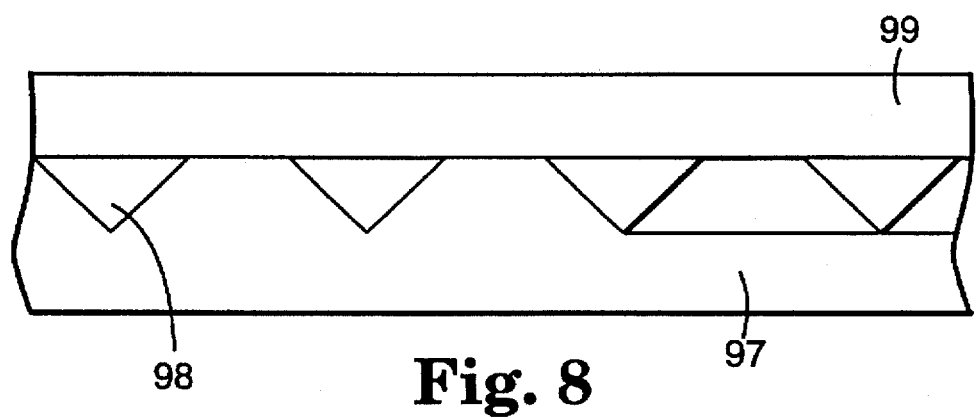
FIG. 8 is a schematic representation of an illustrative multi-layer composite retroreflective material of the present invention.

Due to the unique nature of the decoupled cube corner elements achieved through the practice of the present invention, it is now possible to use relatively simple and widely-available thermal fusion techniques to affix a sealing layer to composite retroreflective sheetings of the invention. This is possible even though structurally more desirable thermoset materials are used for the cube corner layer. By selection of appropriate thermoplastic materials for the overlay film and the sealing layer, it is possible to achieve thermal fusion of the sealing film to the overlay film through the gaps between individual cube corner elements created when the composite material is first flexionally stressed and the minimal land ruptures. Thus the same aspect of composite retroreflective sheetings of the invention that accounts for their surprisingly high degree of flexibility makes it possible to achieve fusion of sealing layer to the composite without the risk of extensive loss of optical characteristics through thermal distortion of individual cube corner elements. This is depicted schematically in FIG. 8 where sealing film 97 can be seen to flow between the individual cube corner elements 98 to reach and fuse with overlay film 99. Although the individual cube corner elements within the sealing legs are typically optically dead, i.e., therefore non-reflective, due to loss of the air interface needed for retroreflectivity, the thermal effects of the sealing process are not transmitted substantially beyond the sealing regions, minimizing the number of cube corner elements that lose optical properties. Thus, superior optical properties of the composite retroreflective sheeting are maintained.

In another embodiment, the invention provides a retroreflective safety device for attachment to an article, e.g., a book bag, bracelet, clothing, toy, chair, boat, flag, etc., the device comprising an ultra-flexible, retroreflective composite sheeting as described herein, optionally adapted for attachment to a desired substrate or article. For instance, sheeting of the invention can be configured in the form of substantially rectangular strips or other desired two-dimensional shapes. In some embodiments, the device further comprises perimeter areas adapted for mounting of the device to the article of human chattel property or personalty, e.g., by mechanical means such as sewing, hook and loop fasteners, clamps, etc. A portion of a hook and loop fastener may be provided on the device for attachment the complementary portion on a substrate, an adhesive layer may be provided, etc. Illustrative examples of useful adhesives include pressure-sensitive adhesive, hot melt adhesive, solvent-activatable adhesive, etc. Alternatively, the device may be adapted to be attached to a substrate by a thermal sealing technique such as radio frequency welding or conductive heat sealing process, or ultrasonic welding.

Advantageously, safety devices of the invention can exhibit the same retroreflective performance described above with respect to the composite retroreflective sheeting alone.

In embodiments to be secured to articles of clothing, the retroreflective safety device preferably remains physically intact and retains greater than 50, more preferably at least about 75, percent of its original retroreflective brightness, after up to twenty five home laundering wash cycles.

In embodiments frequently exposed to daylight conditions, the device preferably retains greater than about 50 percent of its retroreflective brightness following up to about 1000 hours under conditions of accelerated UV weathering. Further, the device preferably retains greater than about 50 percent of its retroreflective brightness following up to about 170 hours at 82° C. (180° F.). Alternatively, the device retains greater than about 50 percent of its retroreflective brightness following up to 48 hours in a temperature and humidity cycling chamber as described below.

Figure 6:
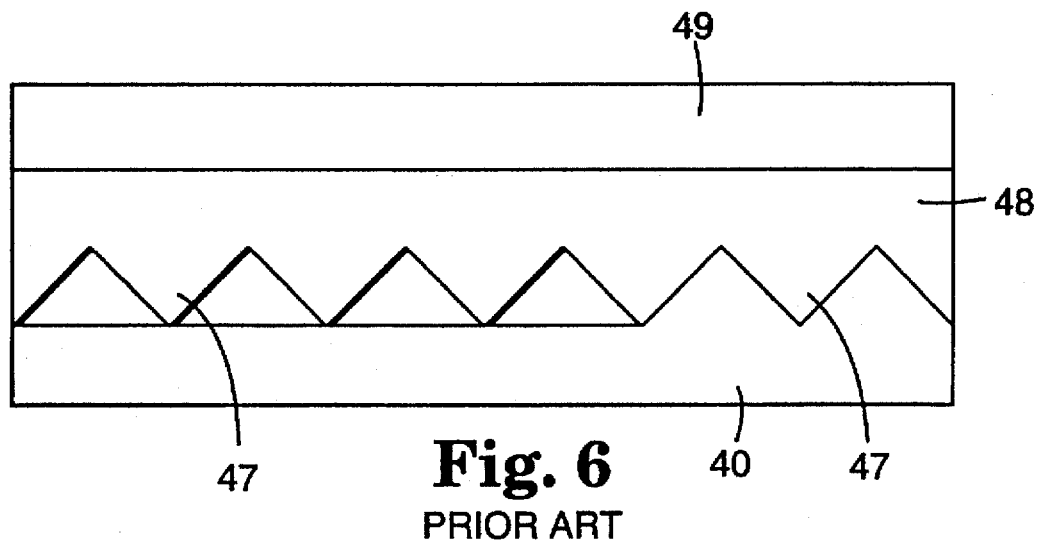
FIG. 6 is a schematic representation of a side view of a retroreflective composite material of the prior art.

FIG. 6 illustrates an embodiment of a composite cube corner retroreflective sheeting representative of the prior art. The retroreflective composite consists of a layer comprising cube corner elements 47, significant land 48, overlay film 49, and sealing film 40 which is sealed to cube corner elements 47. Due to the presence of the significant land material, the resulting composite would be expected to display only minimal flexibility.

Figure 7:
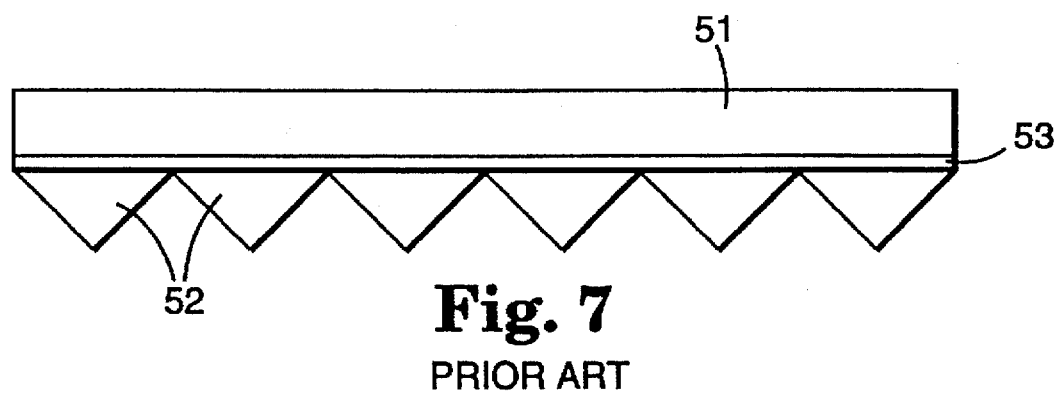
FIG. 7 is a schematic representation of a two layer composite retroreflective material of the prior art characterized by a minimal land area.

FIG. 7 depicts an alternative composition of a cube corner retroreflective sheeting comprising overlay film 51 and plurality of cube corner elements 52. In contrast to the composite sheeting of FIG. 6, the sheeting of FIG. 7 displays a composition with minimal land 53. Although there are general references in the prior art to constructions of this type possessing "zero" land, the actual situation is recognized where the land, though minimized, is present and measurable. This sheeting would be expected to display considerably greater flexibility than the composite of FIG. 6. However, as in the sheeting of FIG. 6, the individual cube corner elements, even with minimal land, remain fused together in a monolithic construction with a resulting mechanical coupling of the individual elements. Thus, unlike the composite sheetings of the present invention, the sheeting of FIG. 7 would experience all of the disadvantages that derive from such mechanical coupling.

Composite retroreflective sheetings of the invention can be secured to desired substrates in a variety of ways, including mechanical and adhesive means. If adhesive is used, the adhesive is preferably applied to only a portion of the back of the sheeting so as to minimize degradation of retroreflective brightness or a sealing layer is preferably used to keep the surfaces of the cube corner elements clear for effective retroreflection.

Illustrative applications of composite retroreflective sheetings of the invention, and safety devices incorporating such sheetings in accordance with the invention include articles of clothing, construction work zone vests, life jackets, rainwear, book bags, logos, patches, promotional items, luggage, briefcases, book bags, backpacks, rafts, canes, umbrellas, flexible signs, animal collars, truck markings, trailer covers and curtains, etc. The previously unattainable combination of retroreflectivity, flexibility, and durability render articles of the invention useful in a variety of applications, including under extremes of environmental conditions and handling in which retroreflective articles did not previously provide desired performance.

In many applications where safety devices of the present invention are affixed to article of personal clothing, it is necessary to subject the devices to repeated cycles of extreme environmental conditions such as would result from machine washing and/or drying, as well as from cycles of wide swings in temperature such as would be experienced by a device or article in the trunk of an automobile exposed to sunlight on a warm summer day. In the latter situation, it is possible for temperatures in an enclosed trunk space to reach as high as 82° to 92° C. (180° to 200° F.). Under some such conditions, it is often desirable to utilize a composite retroreflective sheeting where the cube corner element array further comprises a sealing layer protecting the cube corner elements.

Safety devices of the invention preferably retain greater than about 50 percent of their initial brightness following up to about 1000 hours under conditions of accelerated UV weathering. Further, the device retains greater than about 50 percent of its brightness following up to about 170 hours at 82° C. (180° F.). In some embodiments, the device retains greater than about 50 percent of its brightness, measured as a coefficient of retroreflection, following up to 48 hours in a cycling temperature and humidity chamber as described below.

In some embodiments, retroreflective safety devices of the present invention remain physically intact and have a coefficient of retroreflection of greater than about 50 candellas/lux/square meter, following up to about twenty five home laundering wash cycles utilizing ASTM Test Method E809/810.

EXAMPLES

Features and advantages of this invention are further explained in the following illustrative Examples.

Example 1

A mixture of 1 percent by weight of DAROCUR Brand 4265 (50:50 blend of 2-hydroxy-2-methyl-1-phenylpropan-1-one and 2,4,6-trimethylbenzoyldiphenylphosphine oxide, available from Ciba-Geigy Corp., Hawthorne, N.Y.) was added to a resin mixture of 59 percent by weight PHOTOMER Brand 3016 (a bisphenol A epoxy diacrylate, available from Henkel Corp., Ambler, Pa.), PHOTOMER Brand 4035 (phenoxyethyl acrylate, available from Henkel Corp., Ambler, Pa.) and DAROCUR Brand 1173 (2-hydroxy-2-methyl-1-phenylpropan-1-one, available from Ciba-Geigy Corp., Hawthorne, N.Y.) was used as a resin composition for forming cube corner elements.

The resin composition was cast onto a tool generating 62.5 microns (2.5 mil) tall cube corner elements at 57° C. (135° F.) between the tool and an aliphatic polyurethane overlay film (MORTHANE Brand 3429 urethane from Morton international, Inc., Seabrook, N.H.) on polyethylene terephthalate (PET) carrier film. The rubber nip roll gap was set to minimize the amount of resin composition over the cavities of the tool. The resin was cured through the overlay film and carrier film with one AETEK medium pressure mercury lamp (available from AETEK International of Plainfield, Ill.) set at 160 Watts/cm (400 Watts/inch ("W/in")). Feed rate of material through the cure station was controlled to attain the desired degree of curing (exposure to 100 to 1000 milliJoules/centimeter$^2$ ("mJ/cm$^2$")). Upon completion of the microreplication process as illustrated in FIG. 4 and removal from the tool, the side of the composite with the cube corner elements was irradiated by a medium-pressure mercury lamp (AETEK International) operating at 80 Watts/cm (200 W/in) to provide a post-UV irradiation cure. A portion of this sheeting is referred to below as sample set 1A. On a portion of this sheeting, an aluminum film of 1000 Å thickness was vapor-deposited over the cube corner elements.

The retroreflectivity of the sheeting was measured after removal of the carrier film according to American Society of Testing and Measurement (ASTM) Method No. E 810-93b. The following samples were measured: unstretched sheeting; sheeting after rebound from stretching by hand to 200 percent of its original length; after drying a sample washed in an aqueous solution of DREFT Brand detergent (commercially available); unstretched metallized sheeting and metallized sheeting after rebound from stretching by hand to 200 percent of its original length. The results of this testing are summarized below.

Sample 1A exhibited a retroreflective brightness of 250 candela/lux/meter$^2$ initially, after being stretched, and after begin stretched and washed. Sample 1B exhibited a retroreflective brightness of 310 candelas/lux/meter$^2$ initially and after being stretched.

Retroreflectivity was very uniform upon rotation of the samples through 360°. No loss of cube corner element adhesion to the overlay film was observed nor was any loss of aluminum adhesion to the resin observed on Sample 1B. Qualitatively, the sheeting also observed to exhibit retroreflectivity while in the stretched state.

Example 2

The following resin composition formulations, in parts by weight, were used to form cube corner arrays in the examples as indicated.

| Composition | P-3015 | P-3016 | EB-3200 | TMPTA | THFA | D-4265 |
|---|---|---|---|---|---|---|
| C-1 | 19.8 | — | — | 49.5 | 29.75 | 1.0 |
| C-2 | — | — | 24.75 | 49.5 | 24.75 | 1.0 |
| C-3 | — | 24.75 | — | 49.5 | 24.75 | 1.0 |

PHOTOMER Brand 3015 and 3016 and EBECRYL Brand 3200, from UCB Radcure, Smyrna, Ga. are bisphenol A epoxy diacrylates; TMPTA is trimethylolpropane triacrylate; THFA is tetrahydrofurfuryl acrylate, and DAROCUR Brand 4265 is 50:50 blend of 2-hydroxy-2-methyl-1-phenylpropan-1-one and 2,4,6-trimethylbenzoyldiphenylphosphine oxide.

Three different tools were used as indicated. The tools had depths (and therefore yield cube corner elements of a height) of 0.06 mm (2.5 mil), 0.09 mm (3.5 mil) and 0.18 mm (7.0 mil), respectively.

Four different overlay films as follows were used.

U-0: 150 micron (6 mil) aliphatic polyurethane film (MORTHANE Brand 3429 urethane from Morton International, Inc., Seabrook, N.H.) on removable polyethylene terephthalate (PET) carrier film;

U-1: 150 micron (6 mil) aliphatic polyurethane film (MORTHANE Brand PNO$_3$ urethane from Morton International, Inc., Seabrook, N.H.) on removable polyethylene terephthalate (PET) carrier film;

V-0: 0:250 micron (10 mil) fluorescent yellow-green vinyl film from American Renolit (Chicago, Ill.);

V-1: 200 micron (8 mil) fluorescent yellow-green vinyl film from American Renolit (Chicago, Ill.). In some instances, a sealing film was sealed over the cube corner elements as indicated. In each such instance, the sealing film was a 0.10 mm (4 mil) TiO$_2$-pigmented vinyl film prepared from SHINTECH Brand SE-1100 vinyl pellets obtained from Shinetsu Chemical, Freeport, Tex.

The following cure treatments were used as indicated.

UVL-1: Cast resin formulations were subjected to ultraviolet (UV) curing by exposure to radiation from an AETEK medium pressure mercury lamp (available from AETEK International of Plainfield, Ill.) set at 40 to 160 W/cm (100 to 400 WU/in);

UVL-D: formulations were subjected to UV curing by exposure to radiation from a Fusion D lamp (available from Fusion Systems Corp., Rockville, Md.) operating at approximately 120 W/cm (300 W/in);

VL-1: formulations were subjected to visible (VIS) curing by exposure to radiation from a Fusion V lamp (available from Fusion Systems Corp., Rockville, Md.) operating at approximately 160 W/cm (400 W/in).

Curing was considered to be complete when the sheeting had been exposed to the equivalent of 100 to mJ/cm$^2$ as measured obliquely to exposed surface, regardless of whether the total absorption of radiation occurred in one or more curing treatments.

Samples of composite retroreflective sheetings of the invention were made with the indicated cube corner element resin compositions, tools, overlay films, seal layer, and first and second curing treatments.

| Sample | Resin | Tool | Overlay | Seal | Cure |
|---|---|---|---|---|---|
| 2-A | C-1 | 0.18 | U-1 | none | UVL-1/UVL-1 |
| 2-B | C-3 | 0.18 | V-0 | none | UVL-1/UVL-1 |
| 2-C | C-1 | 0.18 | U-0 | none | UVL-1/UVL-1 |
| 2-D | C-3 | 0.06 | V-1 | none | UVL-1/UVL-1 |
| 2-E | C-1 | 0.06 | U-0 | none | UVL-1/UVL-1 |
| 2-F | C-2 | 0.09 | V-1 | none | VL-1/UVL-D |
| 2-G | C-3 | 0.06 | V-1 | yes | UVL-1/UV-1 |

Comparative composite retroreflective cube corner sheetings were made as described below:

3-A: molten polyvinyl chloride (86K 361 B-2, from Teknor Apex, Pawtucket, R.I.) was cast onto a heated (162° C. (325° F.)) microstructured tool containing microprism recesses having a depth of approximately 0.18 mm. The molten vinyl was cast onto the tooling at approximately $1.03 \times 10^7$ to $1.38 \times 10^7$ pascals (1500 to 2000 pounds/square inch) for 0.7 seconds in order to replicate the microcube recesses; coincident with filling the cube recesses, additional polyvinyl chloride was deposited in a continuous land layer above the tooling with a thickness of approximately 0.38 mm (0.015 inch).

3-B: molten polycarbonate resin (MAKROLON Brand 2407, supplied by Mobay Corp, Pittsburgh, Pa.) was cast onto a heated (215° C. (420° F.)) microstructured tool containing microprism recesses having a depth of approximately 0.09 mm; the molten polycarbonate (287° C. (550° F.)) was cast onto the tooling at approximately $1.03 \times 10^7$ to $1.38 \times 10^7$ pascals (1500 to 2000 pounds/square inch) for 0.7 seconds in order to replicate the microcube recesses; coincident with filling the cube recesses, additional polycarbonate was deposited in a continuous land layer above the tooling with a thickness of approximately 0.104 mm (4 mils). A previously extruded 0.050 mm (2 mils) thick aliphatic polyester urethane overlay film (MORTHANE Brand PNO3 (supplied by Morton International, Seabrook, N.H.) was then laminated onto the top surface of the continuous polycarbonate land layer when the surface temperature was approximately 190° C. (375° F.); the combined tooling with laminated polycarbonate and polyurethane body layer was cooled with room temperature air to allow the laminate material time to solidify.

3-BS: The laminate sample was protected by a 0.025 mm (1 mil) polyester terephthalate film and fed into a nip between a heated steel embossing roll and a 85 durometer rubber roll with a previously extruded polyurethane sealing film. The sealing film was a 0.05 mm (2 mils) thick white ($TiO_2$) pigmented aliphatic polyester urethane (MORTHANE Brand PNO3 supplied by Morton International, Seabrook, N.H.). The embossing pattern was of a chain link configuration; the embossing roll surface temperature was 220° C. (410° F.) and the rubber roll surface temperature was 63° C. (145° F.);

the rolls were turning at a surface speed of 6.09 meters/minute (20 feet/minute), and the force on the nip was held at 114 Newtons/centimeter (65 pounds/inch); the polyester terephthalate protective layers were removed from the samples prior to testing.

In order to further demonstrate the novelty of the current invention, samples were also compared to various commercially available products. A summary of the additional products is given in the table below.

Sample ID Description

3C REFLEXITE GP410

3D REFLEXITE AP1000

3E Fabric, 65/35 percent polyester/cotton blend, basis weight 3 ounces/yard$^2$

3F REFLEXITE vinyl vest trim 3G 3M SCOTCHLITE Brand No. 3810 Retroreflective Sheeting, microsphere-based Flexibility Flexibility was evaluated using a Thwing-Albert Handle-O-Meter Model 211-300 which uses a Linear Variable Differential Transformer (LVDT) to detect the resistance that a blade encounters when forcing a specimen of material into a slot with parallel edges. Unless otherwise indicated, a 6.35 mm (0.25 inch) slot was used.

A number of samples of retroreflective cube corner sheeting of the invention were tested for flexibility as were a number of samples of commercially available retroreflective sheeting. In addition, samples of a woven fabric, representative of the type of materials to which retroreflective sheeting of the present invention may be attached for end use applications were also tested. More flexible materials require less force to be exerted in pushing the samples into the slot of the Handle-O-Meter. For all samples, the data has been normalized for caliper used. As can be seen from the data, the two sheetings of this invention, 2-A and 2-B, have a flexibility closest to that of the fabric.

| Sample | Caliper (mm) | Bend Force (grams/inch) | | | | Force[1] (g/in) | Force[2] (g/in) |
|---|---|---|---|---|---|---|---|
| | | side 1 (MD) | side 1 (CD) | side 2 (MD) | side 2 (CD) | | |
| 2-B | 0.40386 | 131 | 152 | 141 | 142 | 142 | 9 |
| 2-A | 0.33274 | 46 | 41 | 45 | 40 | 43 | 3 |
| 3-A | 0.5588 | >500 | >500 | >500 | >500 | >500 | 23 |
| 3-B | 0.28448 | 570 | 481 | 451 | 451 | 506 | 45 |
| 3-C | 0.5588 | 254 | 395 | 373 | 373 | 306 | 14 |
| 3-D | 0.17018 | 115 | 124 | 128 | 128 | 122 | 18 |
| 3-E | 0.18034 | 16 | 6 | 6 | 6 | 11 | 2 |

MD = machine direction; CD = cross direction
[1] Measured Force
[2] Normalized Force (i.e., = (Bend Force/Caliper) × 1000

Repetitive Flexional Stress Testing

In order to quantify the retention of optical properties after repeated flexing, samples of retroreflective cube sheetings were measured for the initial coefficient of retroreflectivity using Model MCS-7-7.0 Retroluminometer from Todd products Corporation, Farmington, N.Y. The samples were then placed in a Material Flex Testing Machine from Karl Schroeder KG, Weinheim, Germany. The samples were prepared and flexed at a rate of 244 cycles/minute according to DIN 53359 Specimen Form A. Samples were flexed for a total of 50,000 cycles or until they failed as indicated. A final coefficient of retroreflectivity was measured and the percent retention of initial brightness calculated.

| Sample | Brightness | |
|---|---|---|
| | Initial[1] | Retention[2] |
| 2-B | 349 | 81 |
| 2-A | 591 | 91 |
| 3-A | 228 | cracked at 21,000 cycles |
| 3-B | 327 | cracked at 1,600 cycles |
| 3-D | 558 | cracked at 8,000 cycles |
| 3-F | 54 | cracked at 21,500 cycles |
| 3-G | 277 | cracked at 13,000 cycles |

[1] In candela/lux/meter$^2$
[2] In percent of initial brightness or failure cracking noted Several of the samples showed early failure and the number of cycles to failure is noted in the table above. It can be seen that the retroreflective sheetings with the rigid cubes and rigid backings, samples 3B and 3D, show early failure at a low number of flexes. Sample 3G shows failure by cracking at 13,000 cycles. Samples 3A and 3F demonstrate that the continuous vinyl products show early failure in the flex testing at approximately 21,000 cycles. The examples of this invention, samples 2-A and 2-B, show excellent flex life, exhibiting no cracking at 50,000 cycles and with greater than 80 percent retention of brightness.

Tensile Deformation

In order to quantify the retention of optical properties under deformation in the tensile mode, samples of retroreflective cube sheetings were prepared 51 mm (2 inches) in width and 152 mm (6 inches) in length. These were then placed in the jaws of a Sintech 1 Tensile Tester (MTS Systems Corporation, Minneapolis, Minn.) with a 76 mm (4 inch) jaw separation. The initial coefficient of retroreflection of the samples was measured using a portable Field retroreflectometer Model 920, Advanced Retro Technology, Inc., Spring Valley Calif. The samples were then elongated by 2.5, 5, 10, and 20 percent with the retroreflective brightness measured at each elongation condition and the percent retention of initial brightness calculated for each test.

It can be seen that the rigid cubes and backing structures of samples 3-B and 3-D break at very low elongations. The flexible vinyl cube structures of 3-A and 3-F demonstrate substantial loss of retroreflective brightness with tensile deformation; at only 2.5 percent elongation the retroreflective brightness of each was negligible. Sample 3-G is highly flexible and shows that independent beads remain bright under elongation. Samples 2-A and 2-B of the invention exhibited an excellent retention of brightness under elongation as well as a much higher initial brightness compared to the beaded products. For the initial state, i.e., 0 percent elongation, the retroreflective brightness in candela/lux/meter$^2$ is reported. For the elongated states, the percent of initial brightness for that sample is reported.

| Sample | Extent of Elongation | | | | |
|---|---|---|---|---|---|
| | 0% | 2.5% | 5% | 10% | 20% |
| 2-B | 341 | 106 | 83 | 76 | 42 |
| 2-A | 558 | 74 | 51 | 34 | 32 |
| 3-A | 298 | <5 | <5 | <5 | <5 |
| 3-B | 310 | 53 | break | break | break |
| 3-D | 471 | 45 | 40 | break | break |
| 3-F | 85 | <5 | <5 | <5 | <5 |
| 3-G | 254 | 97 | 101 | 96 | 91 |

Retroreflectivity as Function of Planar Deformation at Constant Observation Angle Retroreflectivity of the samples was measured according to procedures set out in ASTM No. E809. The Entrance angles utilized represented angles of interest as set out in the European Standard EN 471. The samples were elongated to 160 percent of original length, and measured again in the relaxed state following elongation. Not many samples could be elongated by 60 percent without tearing. Results were as follows.

| Sample | Entrance Angle | Brightness | |
|---|---|---|---|
| | | Initial[1] | Retained[2] |
| 2-E | 5 | 447 | 106 |
| | 20 | 423 | 103 |
| | 30 | 322 | 97 |
| | 40 | 133 | 76 |
| 2-D | 5 | 354 | 89 |
| | 20 | 356 | 72 |
| | 30 | 277 | 52 |
| | 40 | 108 | 17 |
| 3-C | 5 | 703 | 48 |
| | 20 | 604 | 47 |
| | 30 | 471 | 47 |
| | 40 | 303 | 44 |

[1]In candela/lux/meter$^2$
[2]In percent of initial brightness or cracking

Retroreflective Brightness At Different Observation Angles

Photometric range equipment was used to measure samples in an elongated state using ASTM No. E12.08 at an entrance angle of −10 degrees and at the indicated observation angles. The samples were placed on a cylinder and rotated from −90 degrees to 90 degrees to provide a measure of sample variability. The data reported below is an average of all points of rotation.

| | Brightness | | | | | | | |
|---|---|---|---|---|---|---|---|---|
| | Initial | | | | Elongated | | | |
| | Observation Angle (Degrees) | | | | | | | |
| Sample | 0.15 | 0.3 | 0.5 | 1.1 | 0.15 | 0.3 | 0.5 | 1.1 |
| 2-D | 308 | 153 | 131 | 65 | 52 | 39 | 27 | 24 |
| 2-E | 360 | 193 | 187 | 36 | 40 | 32 | 19 | 26 |
| 3-C | 994 | 457 | 314 | 56 | 86 | 35 | 18 | 29 |
| 3-D | 1661 | 475 | 404 | 59 | F* | F | F | F |
| 3-F | 135 | 102 | 90 | 123 | F | F | F | F |

* = material failure under elongation stress

The samples of retroreflective materials prepared according to the method of the present invention demonstrated a greater ability to be elongated than the other commercially available materials tested for comparison. Samples 2-D and 2-E were elongated 50 percent, i.e., to 150 percent of their original length. Sample 3F tore at the seal line, effectively preventing elongation. Reflexive 3D (AP1000) was a rigid sample and could not be elongated. Sample 3C could only be elongated to 45 percent.

Thermal Stability

Thermal stability was evaluated as follows. Samples were measured for initial retroreflective brightness and then heated in a flat orientation, cube corner element side down at 82° C. (180° F.) in either a Dispatch (Model No. V-29) or VWR Scientific (Model No. 1350 FD) oven for indicated time durations, after which samples were cooled/stabilized to room temperature for an hour. The retroreflective brightness of the samples were recorded at 50 day intervals. Brightness was measured at an entrance angle of −4 degrees and an observation angle of 0.2 degrees according to ASTM No. E809/810.

In order to demonstrate the heat stability of the reflective sheeting of the present invention, samples were exposed to thermal aging. Sample 2-C of the invention had an initial retroreflective brightness of 755 candela/lux/meter$^2$, a brightness of 664 after 50 days, 766 after 100 days, 699 after 150 days, and 535 after 200 days. Samples 3C, 3D, and 3F exhibited erratic results after just a few days, with brightness varying from below 40 percent of initial brightness to above 150 percent of initial brightness, so testing was halted. It is believed the erratic results indicate poor thermal stability.

Humidity and Temperature Cycling

In order to quantify the retention of retroreflective brightness repeated exposure to temperature and humidity cycles, samples of retroreflective sheetings (all without sealing film) were prepared 5 centimeters (2 inches) wide and 15 centimeters (6 inches long) and taped to 6.9 by 30 centimeter (2¾ by 12 inch) aluminum Q panels using white Tedlar tape on all four sides. The initial retroreflective brightness was measured and then the samples were placed in slotted panel holders which held the panels 90 degrees from the horizontal. The panel holders were then placed in a Blue M Cycle chamber produced by General Signal Corporation, Stamford, Conn. The Blue M was programmed to cycle from 60° C. to −40° C. in an 8 hour period. At 60° C., the chamber was maintained at 92 percent relative humidity (RH) for one hour. The samples were removed from the chamber every several days and the retroreflective brightness measured.

Retroreflective brightnesses were measured as reported under Thermal Testing Stability.

The data is presented below. It can be seen that samples 2B, 2A and 3G retain their brightness after 200 hours of testing, whereas samples 3C and 3D have lost about 70 percent of their value. Initial brightness is reported in candelas/lux/meter$^2$ and retained brightness are reported as percent of initial brightness for the indicated number of hours of exposure.

| Sample | Brightness | | | | |
|---|---|---|---|---|---|
| | Initial | 24 | 48 | 120 | 216 |
| 2-B | 326 | 110 | 105 | 104 | 112 |
| 2-A | 836 | 101 | 101 | 99 | 100 |
| 3-D | 1083 | 33 | 34 | 34 | 28 |
| 3-C | 712 | 25 | 25 | 32 | 43 |
| 3-G | 268 | 98 | 100 | 100 | 100 |

Accelerated Weathering

In order to quantify the retention of retroreflective brightness after exposure to ultraviolet (UV) radiation, samples were placed in a Fluorescent UV Condensation Device (Q-Panel Co., Westlake, Ohio) according to ASTM procedure No. G-53 with UV lamps having a peak emission at 340 nm, cycling from 20 hours light at 75° C. and 4 hours dark at 50° C., repeating for a total exposure time of 1000 hrs.

Initial and final retroreflective brightness were measured and the percent retention was calculated as for Thermal Stability. Sample 2-A, a cube corner sheeting of the invention retained 100 percent of its initial retroreflective brightness as compared to sample 3-D which retained only 27 percent of its initial retroreflective brightness.

Launderability

Home Laundry durability tests were performed on retroreflective strips prepared according to the method of the present invention and on comparable retroreflective strips manufactured by Reflexite Corp., Avon, Conn.

Samples were cut and sewn onto a cotton cloth, after which the initial retroreflective brightness was measured prior to washing. Samples were placed into a MAYTAG Brand washer (Model No. A208) and test cloths were added as needed for a total load weight equal to four pounds. Forty grams of AATCC standard detergent were added to the washer and the following conditions used to wash samples. "Regular" action setting, "large" load, "Regular fabric, and "Hot/Cold" temperature setting. The wash temperature was approximately 316° K. (+/−3° K.). Samples were machine dried after every fifth cycle. The MAYTAG Brand dryer (model DE308) was set to "Low" temperature and "Regular" fabric settings for 30 minutes. The samples were washed and dried in somewhat different cycles. Samples of material 2-F were washed once, dried once, washed in four cycles, dried once, and then washed in five cycles and dried once, the last set repeated four times. Samples of material 2-G were washed once and dried once, repeated 15 times, then washed in five cycles and dried once, the last set repeated two times. Samples of material 3-F, both unsealed and sealed versions, were washed a total of 25 times and dried several times each. Samples were cooled to room temperature and the coefficient of retroreflectivity was measured the next morning as was done for Thermal Stability with the initial brightness being reported in candela/lux/meter$^2$ and the retained brightness being reported as a percent of initial brightness. Two or more samples of each material were tested, with the brightness of each sample being checked at two or more locations. The average results were as follows: Sample 2-F, unsealed, had an initial brightness of 594 candela/lux/meter$^2$ and retained 103 percent of initial brightness, Sample 3-F, unsealed, had an initial brightness of 119 candela/lux/meter$^2$ and retained 39 percent of initial brightness, Sample 2-G, sealed, had an initial brightness of 364 candela/lux/meter$^2$ and retained 38 percent of initial brightness, and Sample 3-F, sealed, had an initial brightness of 111 candela/lux/meter$^2$ and retained 20 percent of initial brightness. The cause of the low performance of Sample 2-G was not conclusively determined but may have been a failure of the seal layer.

Various modifications and alterations of this invention will become apparent to those skilled in the art without departing from the scope and spirit of this invention.

What is claimed:

1. A method of manufacturing microstructured composite sheeting comprising the steps of:
   a) providing a tool having a molding surface with a plurality of cavities opening thereon suitable for forming desired microstructures;
   b) applying to said molding surface a volume of a flowable curable resin composition suitable for forming desired microstructure elements;
   c) contacting said resin composition with a first major surface of a transparent overlay film having first and second major surfaces; and
   d) minimizing excess resin composition extending above said cavitites and tool; then e) curing said resin composition while in contact with said overlay film to form a sheeting comprising an array of microstructure elements bonded to said overlay film; then
   f) removing said sheeting from said tool; and
   g) applying mechanical stress to said sheeting so as to cause a fractured separation of substantially each individual microstructure element from surrounding microstructure elements;
   wherein said resin composition and said overlay film are such that said resin composition penetrates said overlay film when contacted thereto such that after said curing said array of cube corner elements are bonded to said overlay film through as interpenetrating network between the material of said microstructure elements and the material of said overlay film.

2. The method of claim 1 wherein said microstructure elements are cube corner elements and wherein said curable resin composition is suitable for forming cube corner elements.

3. The method of claim 1 wherein said curing comprises exposing said resin composition at least one curing treatments selected from the following: actinic radiation from a radiation source, an electron beam, and chemical curing agent.

4. The method of claim 1 further comprising the step of subjecting said resin to a secondary curing treatment.

5. The method of claim 1 further comprising the step of subjecting said sheeting to a heat treatment after said applying mechanical stress.

6. The method of claim 1 wherein said overlay film has an elastic modulus less than about $13 \times 10^8$ pascals.

7. The method of claim 1 wherein the elastic modulus of said microstructure elements is at least $1.0 \times 10^7$ pascals more than the elastic modulus of said overlay film.

8. The method of claim 1 wherein said overlay film is light transmissive.

9. The method of claim 1 wherein said overlay film is selected from the group consisting of the following:
   ionomeric ethylene copolymers, plasticized vinyl halide polymers, acid-functional ethylene copolymers,
   aliphatic polyurethanes, aromatic polyurethanes, other light transmissive elastomer, and combinations thereof.

10. The method of claim 1 wherein said resin composition shrinks when cured.

11. The method of claim 1 wherein said resin composition shrinks by at least 5 percent by volume when cured.

12. The method of claim 1 wherein said resin composition shrinks be between about 5 and about 20 percent by volume when cured.

13. The method of claim 1 wherein said microstructure elements, after curing, have an elastic modulus greater than about $25 \times 10^8$ pascals.

14. The method of claim 1 wherein said microstructure elements have an elastic modulus of at least about $2.0 \times 10^8$ pascals.

15. The method of claim 1 wherein said microstructure elements, comprise a material selected from the group consisting of the following: monofunctional, difunctional, and polyfunctional acrylates.

16. The method of claim 1 wherein said microstructure elements are substantially transparent.

17. A microstructured composite sheeting comprising: (a) a two dimensional array of cured microstructure elements, said array comprising a first polymeric material, and (b) an overlay film having two major surfaces and comprising a second polymeric material, said array being bonded to the first major surface of said overlay film with a fractured land and wherein the material of said microstructure elements and the material of said overlay film form an interpenetrating network, said microstructure elements being substantially independent from adjacent microstructure elements, said microstructure elements having been cured while in contact with said overlay film.

18. A microstructured composite sheeting comprising: (a) a two dimensional array of cured microstructure elements, said microstructure elements being substantially independent from adjacent microstructure elements, said array comprising a first polymeric material, and (b) an overlay film having two major surfaces and comprising a second polymeric material, said array being bonded to the first major surface of said overlay film wherein said array of microstructure elements was cured in situ on said overlay film and wherein the material of said microstructure elements and the material of said overlay film form an interpenetrating network.

19. The sheeting of claim 18 wherein at least some of said microstructure elements were in connection with adjacent microstructure elements through a land after said curing in situ, said land having been fractured such that said microstructure elements are substantially independent.

20. The sheeting of claim 19 wherein said land has a thickness of less than about 10 percent of the average height of said microstructure elements of said array.

21. The sheeting of claim 19 wherein said land has a thickness of less than about 1 percent of the average height of said microstructure elements of said array.

22. The sheeting of claim 18 wherein said microstructure elements are cube corner elements and wherein said composite is a retroreflective sheeting.

23. The sheeting of claim 22 wherein the elastic modulus of said cube corner elements is at least $1.0 \times 10^7$ pascals more than the elastic modulus of said overlay film.

24. The sheeting of claim 22 wherein said cube corner elements have an elastic modulus of at least about $2.0 \times 10^8$ pascals.

25. The sheeting of claim 22 wherein said cube corner elements have an elastic modulus of at least about $25 \times 10^8$ pascals.

26. The sheeting of claim 22 wherein said sheeting has a coefficient of retroreflectivity greater than about 50 candelas per lux per square meter, measured at an entrance angle of $-4°$ and an observation angle of $0.2°$.

27. The sheeting of claim 26 wherein said sheeting has a coefficient of retroreflectivity greater than about 250 candelas per lux per square meter.

28. The sheeting of claim 26 wherein said sheeting has a coefficient of retroreflectivity greater than about 500 candelas per lux per square meter.

29. The sheeting of claim 22 having a coefficient of retroreflectivity greater than about 50 candelas per lux per square meter, measured at an entrance angle of $-4°$ and an observation angle of $0.2°$, when said sheeting has been elongated to 110 percent of its original length.

30. The sheeting of claim 22 having a coefficient of retroreflectivity, measured at an entrance angle of $-4°$ and an observation angle of $0.2°$, after being stretched to at least 110 percent of its original length that is at least 30 percent of it initial coefficient of retroreflectivity.

31. The sheeting of claim 22 having a coefficient of retroreflectivity, measured at an entrance angle of $-4°$ and an observation angle of $0.2°$, after being stretched to at least 110 percent of its original length that is at least 50 percent of it initial coefficient of retroreflectivity.

32. The sheeting of claim 22 having a retroreflective brightness greater than about 75 percent of its initial retroreflective brightness after being stretched 10 percent in one dimension and allowed to relax.

33. The sheeting of claim 22 having a coefficient of retroreflectivity of at least 50 candela/lux/meter$^2$, measured at an entrance angle of $-10°$ and an observation angle of $0.15°$ when elongated to 150 percent of its original length over a radius of curvature of about 150 millimeters.

34. The sheeting of claim 22 having a retroreflective brightness of greater than about 50 percent of its initial brightness after being laundered for twenty five home laundering cycles.

35. The sheeting of claim 34 having a retroreflective brightness of greater than about 75 percent of its initial brightness after being laundered for twenty five home laundering cycles.

36. The sheeting of claim 22 having a retroreflective brightness of greater than about 50 percent of its initial brightness after 1000 hours of accelerated UV weathering.

37. The sheeting of claim 22 having a retroreflective brightness of greater than about 50 percent of its initial brightness after 170 hours at 82° C.

38. The sheeting of claim 22 having a retroreflective brightness of greater than about 50 percent of its initial brightness after 48 hours in a temperature and humidity cycling chamber.

39. The sheeting of claim 22 further comprising a reflective layer on said cube corner elements.

40. The sheeting of claim 22 further comprising a sealing film adhered to the cube corner side of said sheeting in an interconnecting network so as form cells in which cube corner elements are encapsulated.

41. An article comprising a sheeting of claim 40 bonded thereto wherein said sealing film acts as the bonding.

42. The sheeting of claim 18 wherein said first polymeric material shrunk while curing.

43. The sheeting of claim 18 wherein said overlay film has an elastic modulus of less than about $13 \times 10^8$ pascals.

44. The sheeting of claim 18 wherein said first polymeric material is a thermoset material or a thermoplastic material.

45. The sheeting of claim 18 wherein said overlay film is an elastomeric film.

46. The sheeting of claim 18 wherein said overlay film is extensible and has substantially no tendency to recover.

47. The sheeting of claim 18 further comprising a sealing layer adhered to said overlay film through openings between individual microstructure elements.

48. An article of personally comprising a sheeting of claim 18 attached thereto.

* * * * *